(12) United States Patent
Mayama

(10) Patent No.: US 9,001,398 B2
(45) Date of Patent: Apr. 7, 2015

(54) IMAGE READING DEVICE AND VERTICAL STRIPE DETERMINATION METHOD

(71) Applicant: Hiroki Mayama, Kanagawa (JP)

(72) Inventor: Hiroki Mayama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/210,207

(22) Filed: Mar. 13, 2014

(65) Prior Publication Data

US 2014/0268256 A1 Sep. 18, 2014

(30) Foreign Application Priority Data

Mar. 14, 2013 (JP) ................................. 2013-052484
Jan. 16, 2014 (JP) ................................. 2014-006253

(51) Int. Cl.
| H04N 1/04 | (2006.01) |
| H04N 1/38 | (2006.01) |
| H04N 1/024 | (2006.01) |
| H04N 1/10 | (2006.01) |

(52) U.S. Cl.
CPC ............. *H04N 1/024* (2013.01); *H04N 1/1008* (2013.01)

(58) Field of Classification Search
None
See application file for complete search history.

(56) References Cited

U.S. PATENT DOCUMENTS

| 6,317,223 | B1 * | 11/2001 | Rudak et al. ................... 382/275 |
| 6,393,161 | B1 * | 5/2002 | Stevenson et al. ............ 382/275 |
| 6,522,431 | B1 * | 2/2003 | Pitts et al. ..................... 358/474 |
| 7,119,926 | B2 * | 10/2006 | Takeda et al. .................. 358/1.9 |
| 7,212,320 | B2 | 5/2007 | Imoto |
| 7,349,108 | B2 * | 3/2008 | Ito ................................. 358/1.12 |
| 7,719,726 | B2 * | 5/2010 | Kamei et al. .................. 358/463 |
| 7,995,253 | B2 * | 8/2011 | Kagami ......................... 358/496 |
| 8,203,761 | B2 * | 6/2012 | Arima ........................... 358/3.26 |
| 8,339,685 | B2 * | 12/2012 | Shiraishi et al. .............. 358/497 |
| 8,358,452 | B2 * | 1/2013 | Haas et al. ..................... 382/275 |
| 8,749,850 | B2 * | 6/2014 | Ikegawa ........................ 358/3.26 |
| 8,837,018 | B2 * | 9/2014 | Matsui .......................... 358/498 |
| 2002/0075527 | A1 * | 6/2002 | Ito ................................. 358/496 |
| 2002/0176634 | A1 * | 11/2002 | Ohashi .......................... 382/275 |
| 2010/0134855 | A1 * | 6/2010 | Oumi ............................ 358/475 |
| 2010/0328735 | A1 * | 12/2010 | Matsui .......................... 358/488 |
| 2012/0105921 | A1 * | 5/2012 | Ikari ............................. 358/474 |

FOREIGN PATENT DOCUMENTS

| JP | 2001-272829 | 10/2001 |
| JP | 2010-268043 | 11/2010 |

\* cited by examiner

*Primary Examiner* — Cheukfan Lee
(74) *Attorney, Agent, or Firm* — Duft Bornsen & Fettig LLP

(57) ABSTRACT

An image reading device includes a reading glass moving unit that moves a reading glass; a determining unit that determines whether or not a read image obtained by the sheet-through reading unit includes a vertical stripe which represents linear images continuous in the original carrying direction; a determining unit that, when a vertical stripe is formed, determines matching/mismatching of the positions of the vertical stripe in read images of an original carrying member which are obtained before and after moving the reading glass; a determining unit that, based on determination indicating mismatching, determines that a causing matter of the vertical stripe is present on the reading glass and, based on determination indicating matching, determines that a causing matter of the vertical stripe is present on a portion other than the reading glass; and a determining unit that determines the type of the causing matter.

11 Claims, 14 Drawing Sheets

FIG.2
(A)
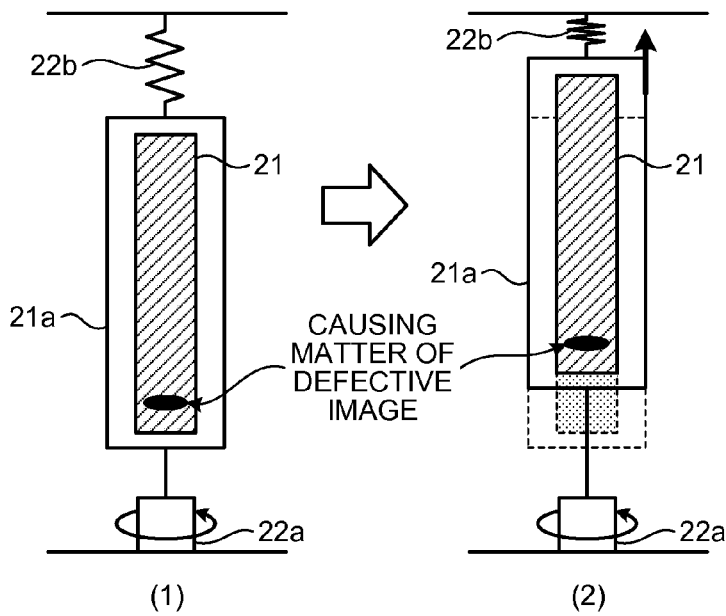
(B)
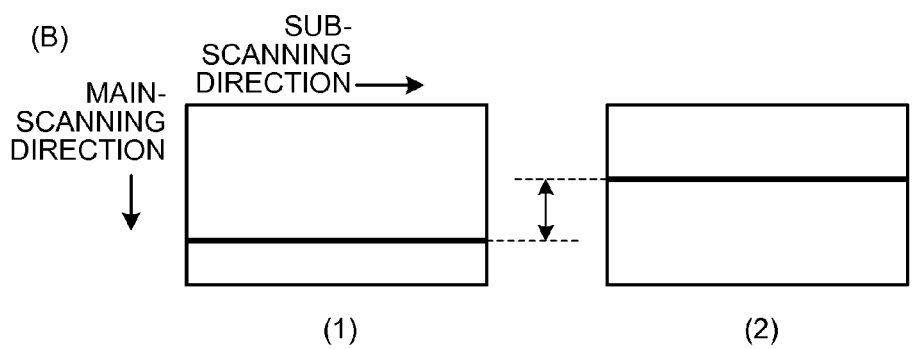
(C)
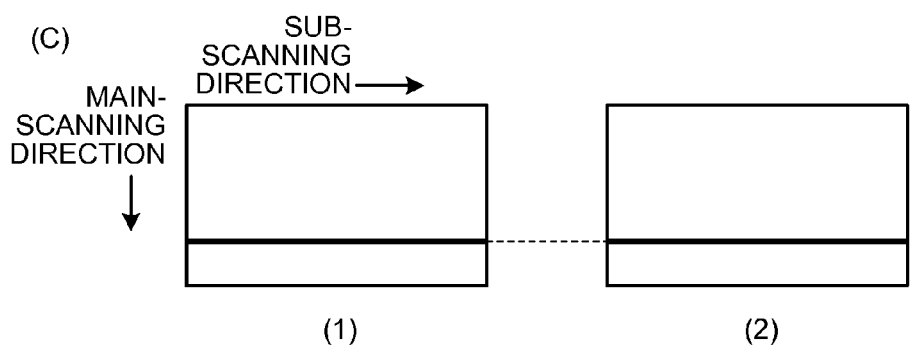

FIG.3
(A) BEFORE SHEET-THROUGH READING
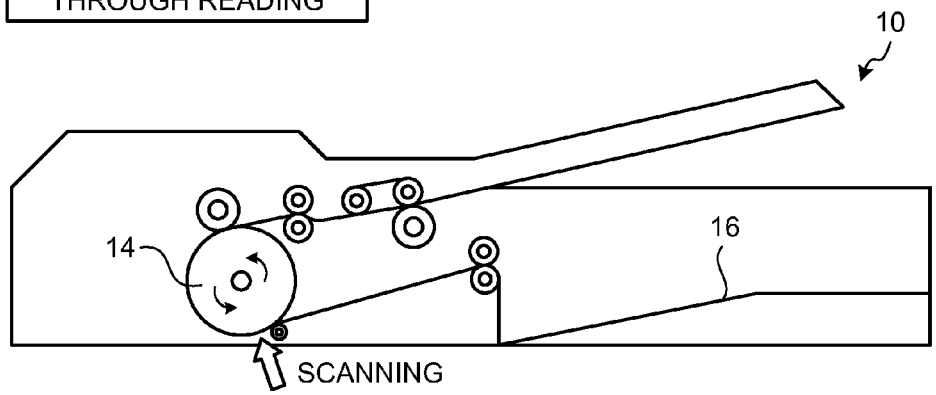
(B) DURING SHEET-THROUGH READING
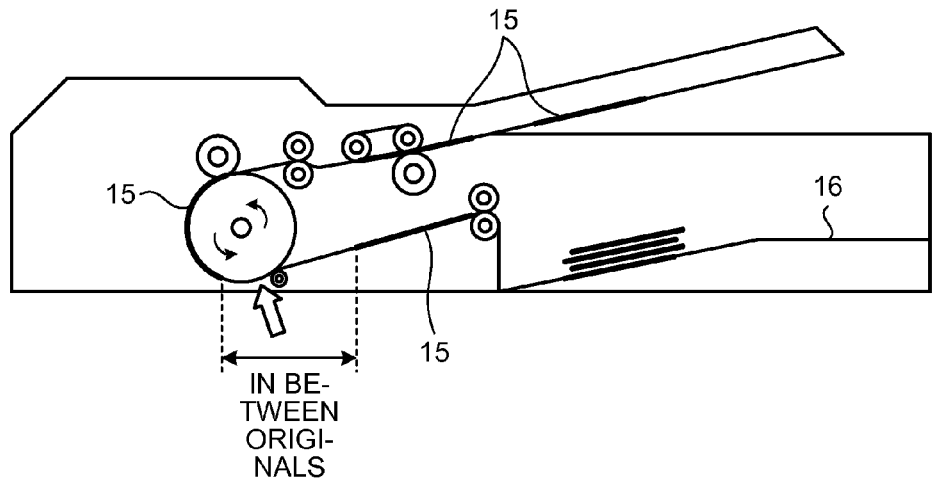
(C)
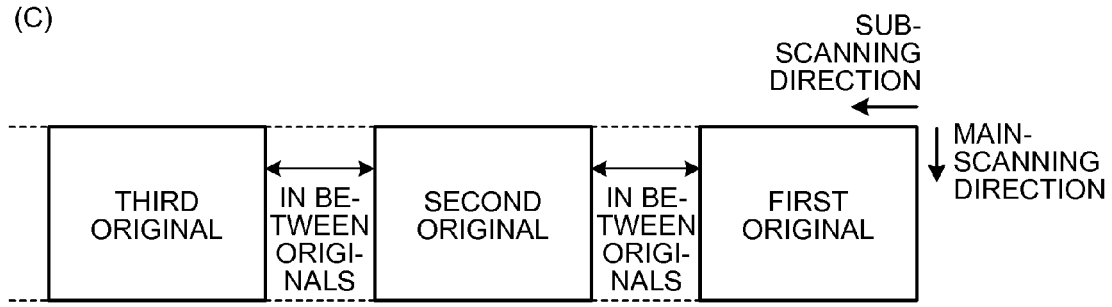

FIG.4
(A)
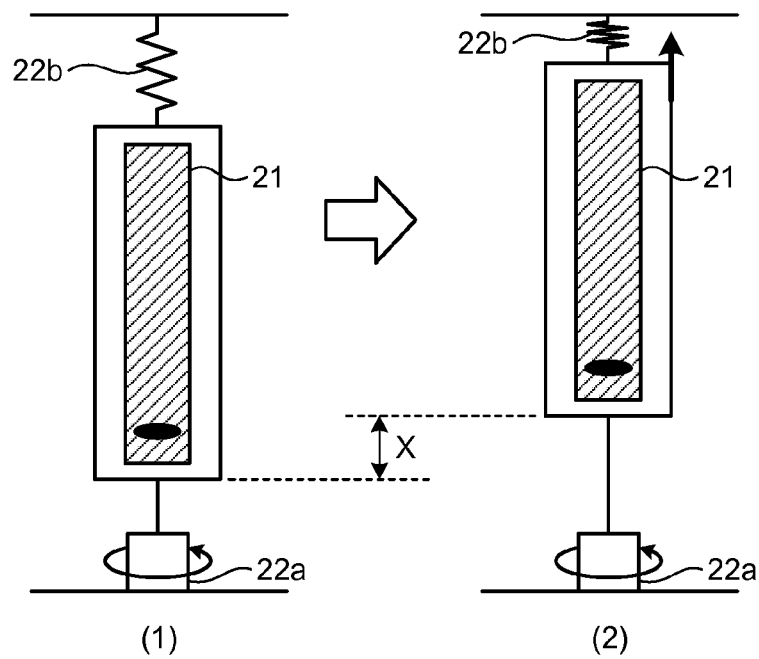
(B)
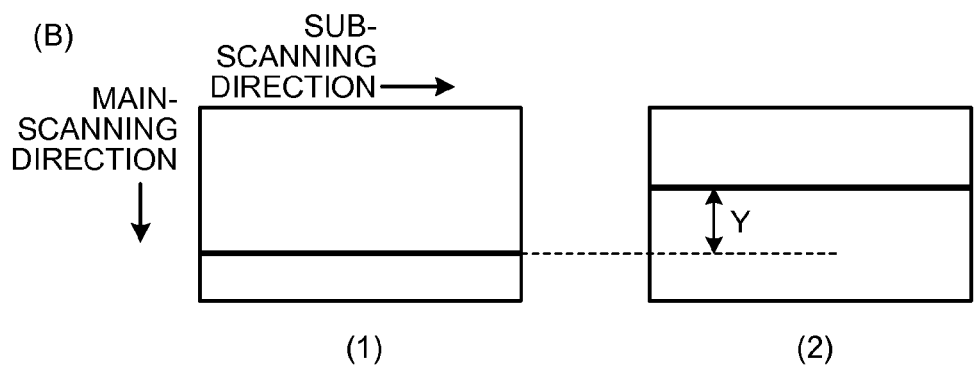

FIG.14

| | | DETERMINATION METHOD | CLASSIFICATION OF CAUSING MATTER (LOCATION, TYPE) | | POST-DETERMINATION ACTION |
|---|---|---|---|---|---|
| (1) LOCATION | (1)-1 BEFORE SCANNING | UPON OBTAINING IMAGES BEFORE AND AFTER MOVING READING GLASS IN MAIN SCANNING DIRECTION, WHEN VERTICAL STRIPE PRESENT IN IMAGES HAS SHIFTED POSITION IN MAIN-SCANNING DIRECTION | READING GLASS | | DETERMINE TYPE AND SIZE OF CAUSING MATTER, AND TAKE ACTION (AUTOMATIC AVOIDANCE OR NOTIFICATION) |
| | | UPON OBTAINING IMAGES BEFORE AND AFTER MOVING READING GLASS IN MAIN SCANNING DIRECTION, WHEN VERTICAL STRIPE PRESENT IN IMAGES HAS NOT SHIFTED POSITION IN MAIN-SCANNING DIRECTION | PORTION OTHER THAN READING GLASS CARRYING ROLLERS/ BELT | | ISSUE MESSAGE OF COMPONENT CHECKING TO USER |
| | (1)-2 DURING SCANNING | UPON COMPARING IMAGE IN WHICH IS CAPTURED CARRYING BELT IN ROTATING STATE AND WHICH IS OBTAINED BEFORE SCANNING WITH IMAGE IN WHICH IS CAPTURED CARRYING BELT AND WHICH IS OBTAINED IN BETWEEN TWO ORIGINALS DURING SCANNING, WHEN READ IMAGES ARE NOT IDENTICAL | READING GLASS | | DETERMINE TYPE AND SIZE OF CAUSING MATTER, AND TAKE ACTION (AUTOMATIC AVOIDANCE OR NOTIFICATION) |
| | | UPON COMPARING IMAGE IN WHICH IS CAPTURED CARRYING BELT IN ROTATING STATE AND WHICH IS OBTAINED BEFORE SCANNING WITH IMAGE IN WHICH IS CAPTURED CARRYING BELT AND WHICH IS OBTAINED IN BETWEEN TWO ORIGINALS DURING SCANNING, WHEN READ IMAGES ARE IDENTICAL | CARRYING ROLLERS/ BELT | | DETERMINE THAT DIRT IS PRESENT ON CARRYING BELT, AND TAKE NO ACTION BECAUSE THERE IS NO EFFECT ON IMAGE DURING SHEET-THROUGH READING |
| (2) TYPE | | •UPON OBTAINING IMAGES BEFORE AND AFTER MOVING READING GLASS, WHEN AMOUNT OF MOVEMENT OF READING GLASS IS IDENTICAL TO AMOUNT OF SHIFT IN VERTICAL STRIPE •DENSITY OF VERTICAL STRIPE IS EQUAL TO OR GREATER THAN THRESHOLD VALUE | STICKING TEN- DENCY | REMOV- ABLE BY CLEANING (DIRT) | DETERMINE SIZE OF DIRT, AND DETERMINE WHETHER OR NOT CLEANING IS REQUIRED |
| | | •UPON OBTAINING IMAGES BEFORE AND AFTER MOVING READING GLASS, WHEN AMOUNT OF MOVEMENT OF READING GLASS IS IDENTICAL TO AMOUNT OF SHIFT IN VERTICAL STRIPE •DENSITY OF VERTICAL STRIPE IS SMALLER THAN THRESHOLD VALUE | | IRREMOV- ABLE BY CLEANING (SCRATCH) | ISSUE MESSAGE TO PROMPT USER TO REPLACE READING GLASS |
| | | UPON OBTAINING IMAGES BEFORE AND AFTER MOVING READING GLASS, WHEN AMOUNT OF MOVEMENT OF READING GLASS IS NOT IDENTICAL TO AMOUNT OF SHIFT IN VERTICAL STRIPE | FLOATING TENDENCY (FOREIGN PARTICLE/ DIRT) | | DETERMINE SIZE OF FOREIGN PARTICLE/DIRT, AND DETERMINE WHETHER OR NOT CLEANING IS REQUIRED |
| | | FROM POSITION OF VERTICAL STRIPE IN MAIN-SCANNING DIRECTION, DETERMINE THICKNESS OF VERTICAL STRIPE IN IMAGE | SIZE AND ATTACHMENT LOCATION IN MAIN- SCANNING DIRECTION | | WHILE DISPLAYING MESSAGE SPECIFYING NEED FOR CLEANING, NOTIFY SIZE AND POSITION OF DIRT IN MAIN- SCANNING DIRECTION |
| (3) SIZE | | PRESENCE OR ABSENCE OF VERTICAL STRIPE IN IMAGE IS DETERMINED IN EACH COMPONENT OF THREE LINE SENSOR | SIZE AND ATTACHMENT LOCATION IN SUB- SCANNING DIRECTION | | •ATTEMPT TO ACHIEVE AUTOMATIC AVOIDANCE OF DIRT BY MOVING CARRIAGE IN SUB-SCANNING DIRECTION FOR SEVERAL TIMES •WHEN AUTOMATIC AVOIDANCE IS NOT POSSIBLE, ISSUE MESSAGE SPECIFYING NEED FOR CLEANING AND NOTIFY POSITION/SIZE OF DIRT IN SUB-SCANNING DIRECTION |

IMAGE READING DEVICE AND VERTICAL STRIPE DETERMINATION METHOD

CROSS-REFERENCE TO RELATED APPLICATIONS

The present application claims priority to and incorporates by reference the entire contents of Japanese Patent Application No. 2013-052484 filed in Japan on Mar. 14, 2013 and Japanese Patent Application No. 2014-006253 filed in Japan on Jan. 16, 2014.

BACKGROUND OF THE INVENTION

1. Field of the Invention

The present invention relates to an image reading device and a vertical stripe determination method.

2. Description of the Related Art

In an image reading device, what is called sheet-through reading is performed during which an original is carried in the sub-scanning direction while keeping a reading unit fixed, and image reading is performed on the surface of a reading glass. During sheet-through reading, if any dirt is present on the reading glass (surface), a defective image having vertical stripes (unintended lines continuous in the sub-scanning direction) gets generated.

In order to prevent generation of such a defective image, various proposals have been put forward in the past. For example, prior to performing a reading operation, it is determined whether any foreign particle is present on an optical component, such as carrying rollers or a belt, other than the reading glass (hereinafter, simply referred to as "components except the reading glass") or on the reading glass (surface). Besides, in case vertical stripes are formed, it is also known that image processing is performed with the aim of correcting the vertical stripes or that automatic cleaning of the reading glass is carried out.

In such conventional technologies, the dirt present on the reading glass (surface) is detected using a carried original. For that reason, even if the dirt is detected, the carried original used for dirt detection needs to be reprinted, which requires time and effort of the user. In addition to that, in the conventional dirt detection technique, it is nothing more than simply providing information about whether the dirt is present on the reading glass or on the components except the reading glass. That is, no determination of the cause of the vertical stripes is performed, and no appropriate measures for preventing formation of the vertical stripes are notified to the user. Hence, such information is not sufficient in order to perform vertical stripe correction. Moreover, even if vertical stripes are detected and if an operation of correcting vertical stripe images is performed, it may lead to a decline in the image quality. Furthermore, as far as the vertical stripes caused due to a scratch on the reading glass is concerned, neither automatic cleaning of the reading glass enables achieving the fundamental solution, nor it is possible to determine such a cause.

For such reasons, the conventional technology fails to be adequate in determining the cause of the generation of vertical stripe images. Besides, if correction of vertical stripe images is performed, it may have an impact on the image quality.

For example, in Japan Patent Application Laid-open No. 2001-272829 is disclosed a technology in which reading is done by moving an original while keeping the optical system fixed (sheet-through reading). During such reading, it is determined whether any foreign particle is present on a white board (a pressurizing board) or on a contact glass of an automatic original carrying unit. Thus, in Japan Patent Application Laid-open No. 2001-272829, there is description about the means for moving the contact glass in either the same direction as an original or in an orthogonal direction to an original and about the means for detecting the dirt. As far as the means for detecting the dirt is concerned, a foreign particle detecting circuit compares a read image obtained before the contact glass is moved with a read image obtained after the contact glass has been moved, and determines whether any dirt is present on the white board (the pressurizing board) or on the contact glass of the automatic original carrying unit.

Such a conventional device is similar to the present invention described below on the issue of determining the location (whereabouts) of causing vertical stripe images during sheet-through reading. However, after the location causing the vertical stripe images is determined (i.e., after a causing matter (described later) is determined), it is not possible to determine the type of that causing matter. Besides, no means is available for notifying the appropriate measures to be taken against that cause. Moreover, since it is not possible to distinguish between the dirt present on the reading glass and a scratch on the reading glass, the issue that the user does not have adequate information for removing vertical stripe images remains unresolved.

Therefore, there is a need for an image reading device that capable of providing if vertical stripes are formed in a read image, not only location information regarding the causing matter of vertical stripes but information regarding the type of the causing matter.

SUMMARY OF THE INVENTION

According to an embodiment, an image reading device includes a sheet-through reading unit in which a reading unit is fixed and image reading is performed through a reading glass while carrying an original. The image reading device includes a reading glass moving unit configured to move the reading glass in a direction orthogonal to an original carrying direction; a vertical stripe formation determining unit configured to determine whether or not a read image obtained by the sheet-through reading unit includes a vertical stripe which represents linear images continuous in the original carrying direction; a vertical stripe position determining unit configured to, when a vertical stripe is formed, determine matching/mismatching of positions of the vertical stripe in read images of an original carrying member which are obtained before and after moving the reading glass; a causing matter location determining unit configured to, based on determination indicating mismatching performed by the vertical stripe position determining unit, determine that a causing matter of the vertical stripe is present on the reading glass and, based on determination indicating matching performed by the vertical stripe position determining unit, determine that a causing matter of the vertical stripe is present on a portion other than the reading glass; and a causing matter type determining unit configured to determine a type of the causing matter.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1(A) is a front view of a document feeder of the image reading device according to the embodiment of the present invention. FIG. 1(B) is a front view in which a scanner unit of the image reading device according to the embodiment of the present invention is illustrated in a cross-section. FIG. 1(C) is a planar view of the scanner unit illustrated in FIG. 1(B);

FIG. 2(A) is a diagram for explaining a means and a method for determining the location of a causing matter. FIG. 2(A) is a planar view illustrating the states of a reading glass before and after being moved in the main-scanning direction. FIG. 2(B) and FIG. 2(C) are diagrams illustrating read images obtained before and after moving the reading glass in the main-scanning direction;

FIG. 3 is a diagram for explaining a method implemented during sheet-through reading for detecting that the causing matter is formed during reading. FIG. 3(A) is a front view of a state before performing sheet-through reading of originals. FIG. 3(B) is a planar view in which, during sheet-through reading of originals, the document feeder is illustrated in a cross-section. FIG. 3(C) is a diagram illustrating read images obtained in between carried originals during sheet-through reading;

FIG. 4 is a diagram for explaining type determination of the causing matter present on the surface of the reading glass. FIG. 4(A) is a planar view illustrating the states of the reading glass before and after being moved in the main-scanning direction. FIG. 4(B) is a diagram illustrating read images obtained before and after moving the reading glass in the main-scanning direction;

FIG. 5(A) is a planar view of the scanner unit identical to FIG. 1(B). In FIG. 5(B), section (1) illustrates the positional relationship between the dirt present on the reading glass and a color CCD sensor, while section (2) illustrates read images that appear in the RGB components corresponding to that positional relationship. In FIG. 5(C), section (1) and section (2) are identical to section (1) in FIG. 5(B), while section (3) illustrates a state in which a carriage is moved in the direction of the B component from the position in section (2) in FIG. 5(C). In FIG. 5(D), section (1) illustrates read images (vertical stripe images) of the RGB components of the CCD line sensor 28 in the state illustrated in section (1) in FIG. 5(C), while section (2) illustrates read images (vertical stripe images) in the state illustrated in section (2) in FIG. 5(C);

Figure 6:
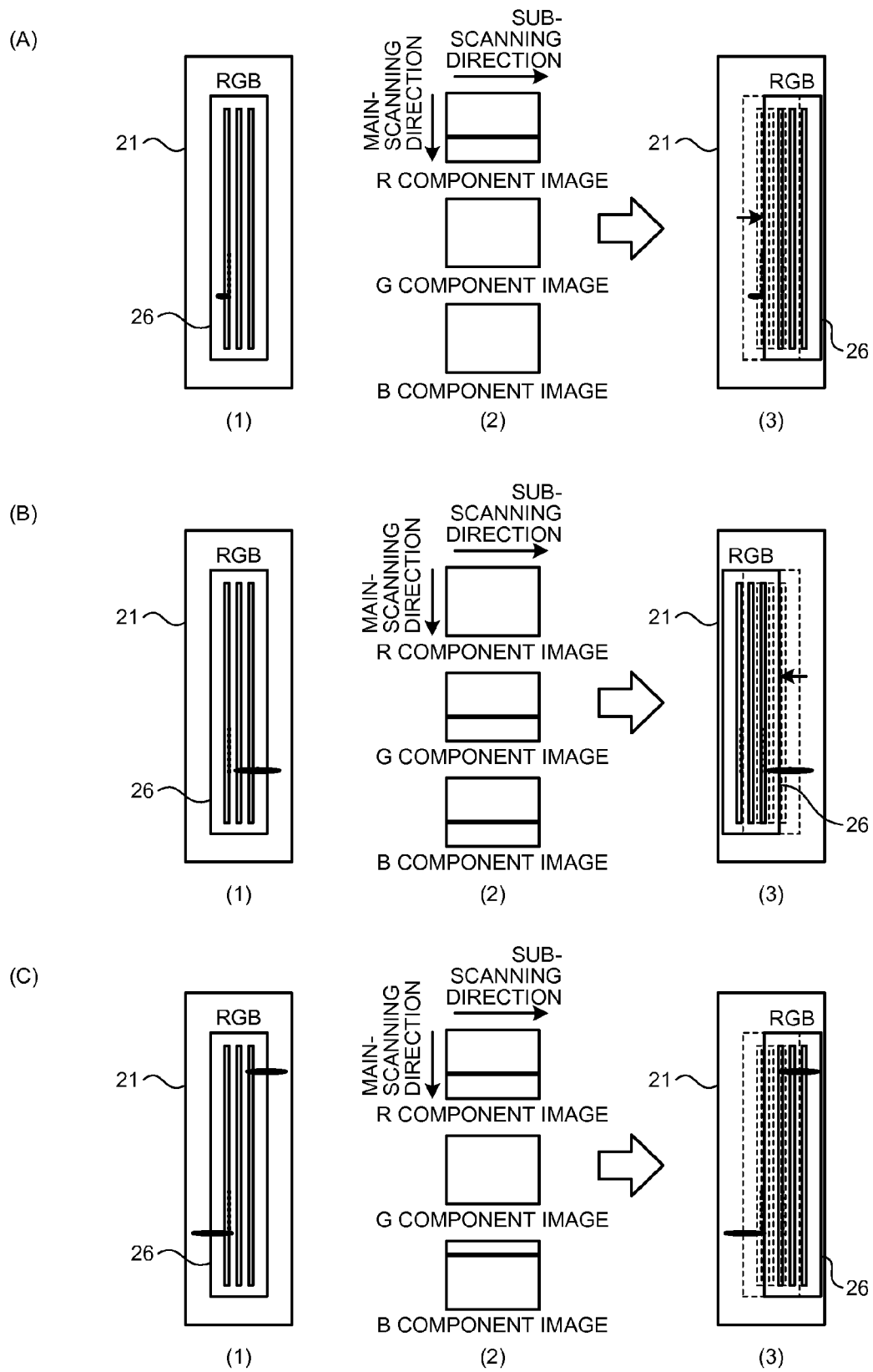
Figure 7:
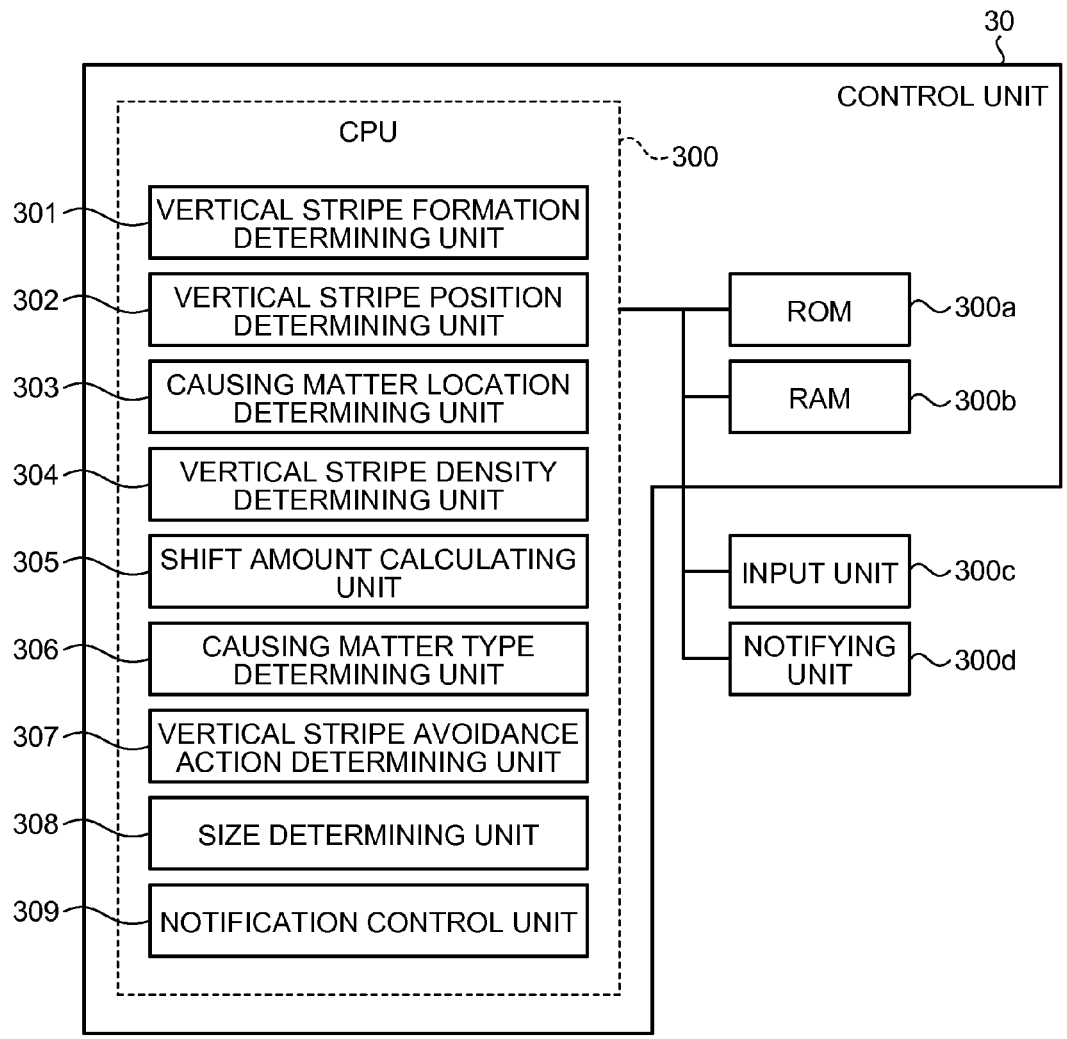
Figure 8:
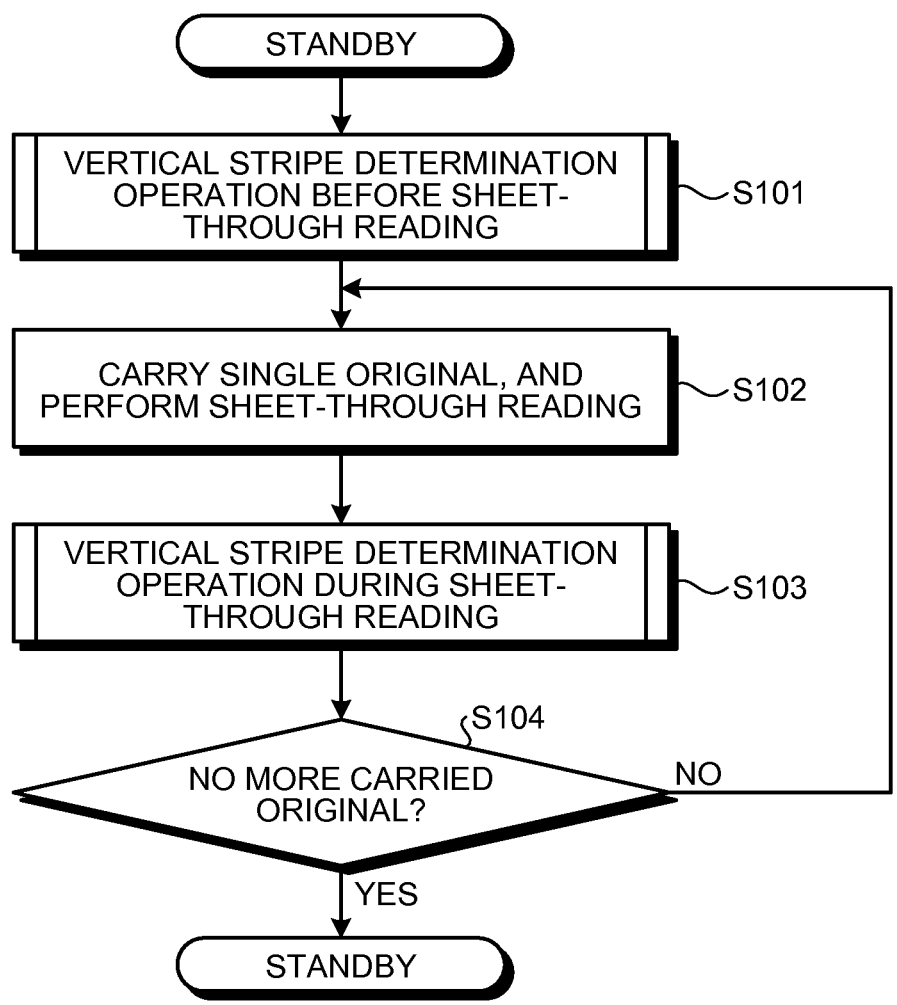
Figure 9:
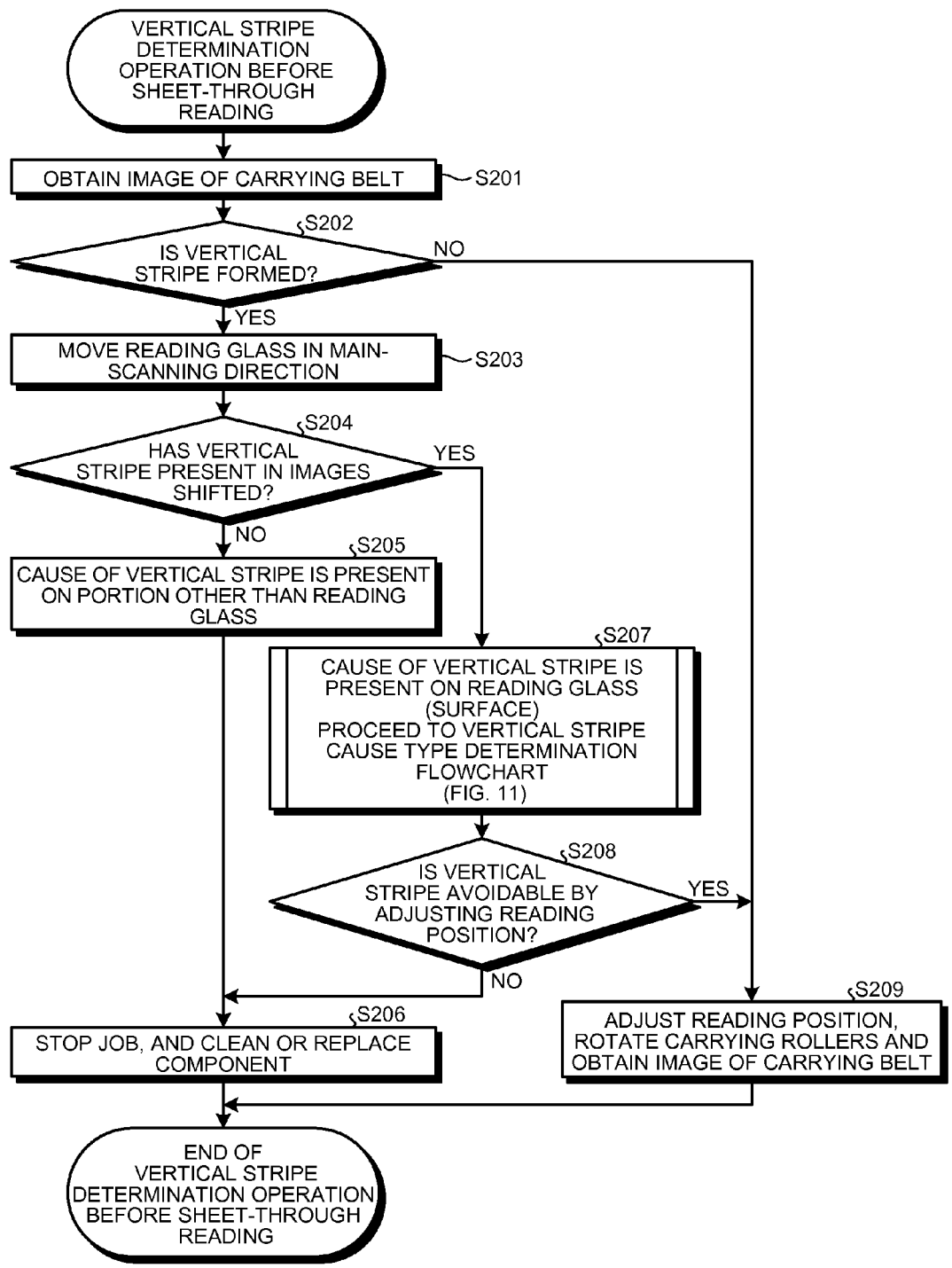
Figure 10:
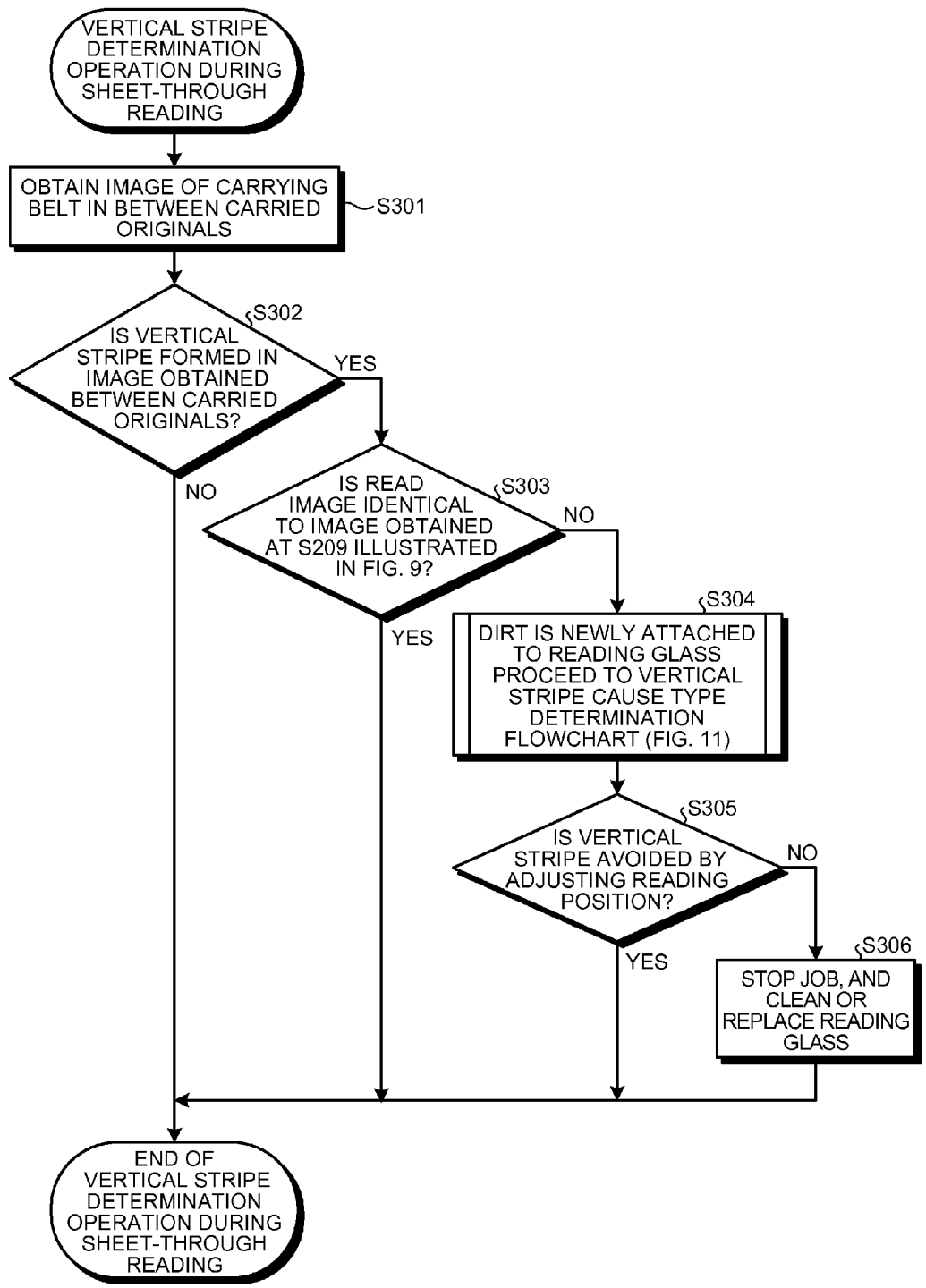
Figure 11:
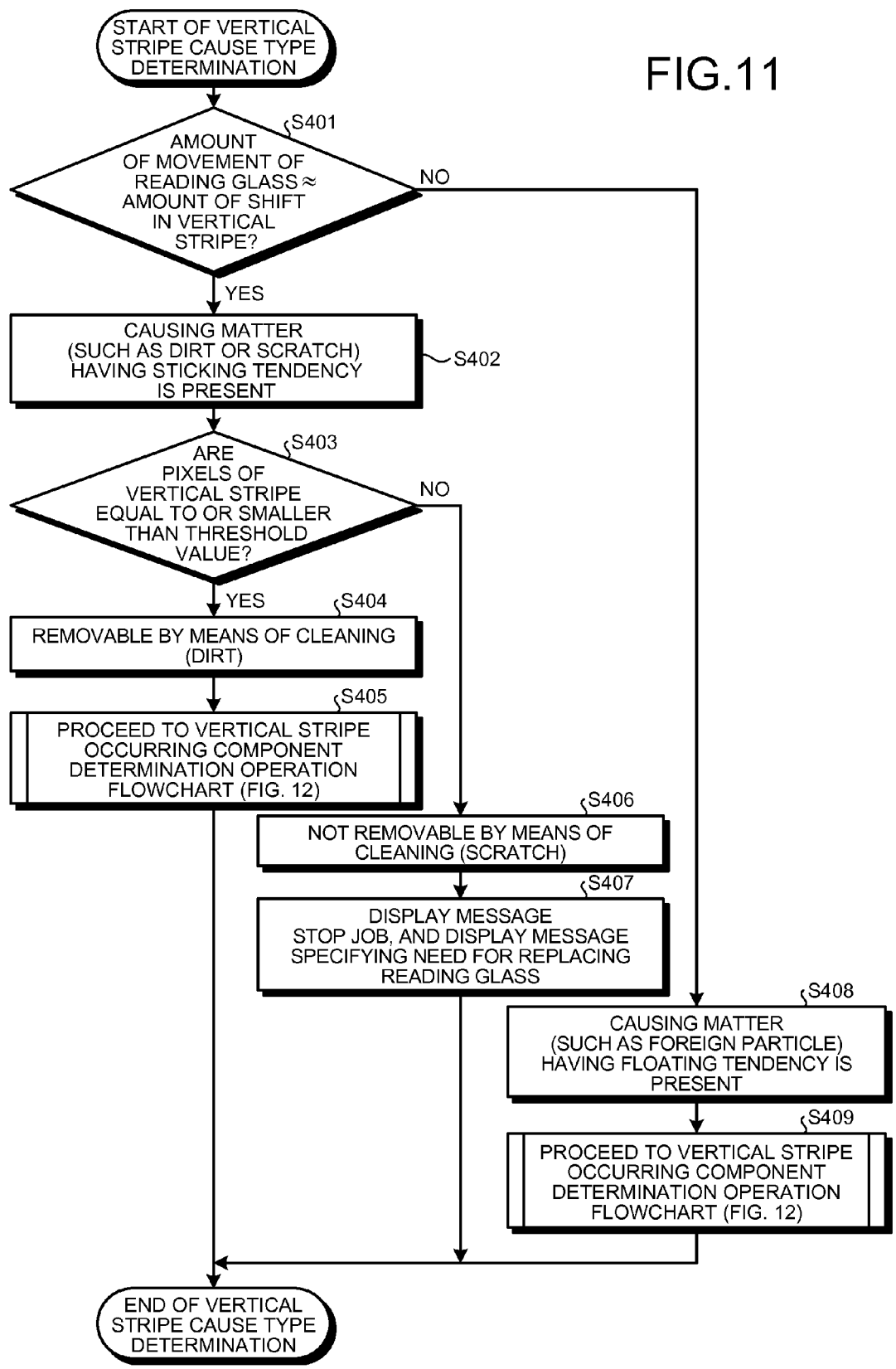
Figure 12:
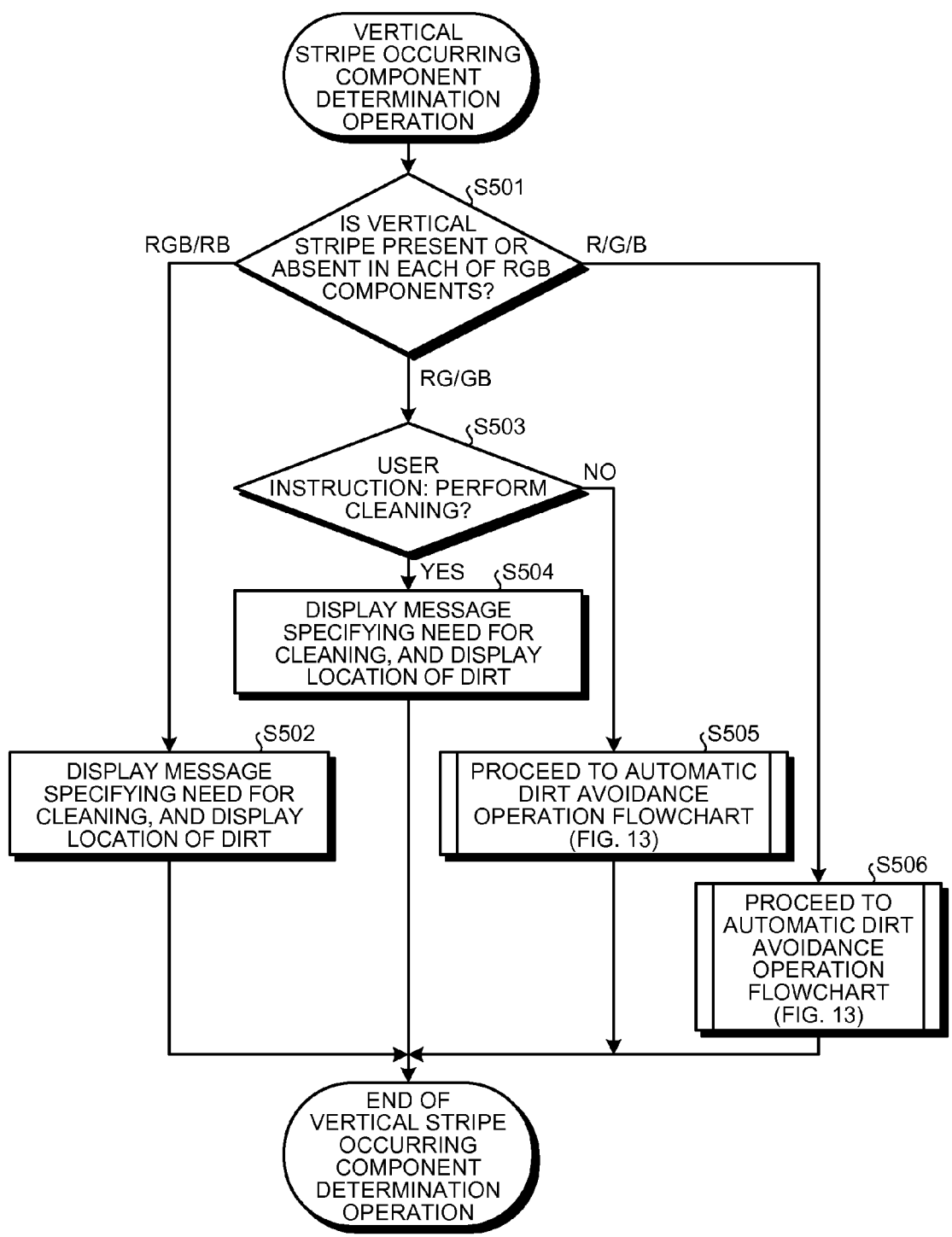
Figure 13:
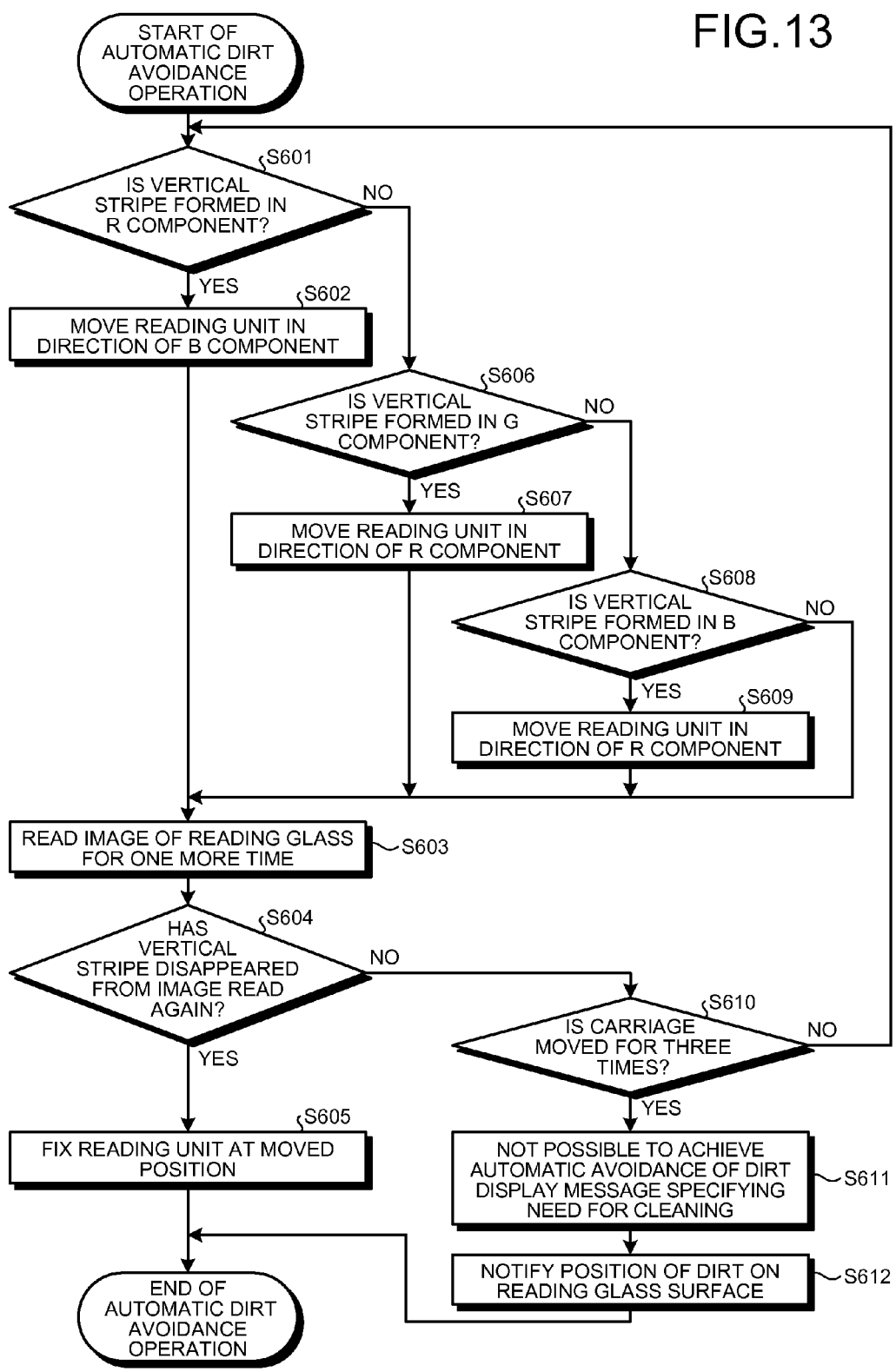

In each of FIGS. 6(A) to 6(C), section (1) illustrates the positional relationship between the dirt present on the reading glass and the line sensor. Moreover, in each of FIGS. 6(A) to 6(C), section (2) illustrates reading images obtained in the state of corresponding section (1). Furthermore, in FIGS. 6(A) to 6(C), section (3) illustrates a state obtained by moving the carriage from the state in corresponding section (1);

FIG. 7 is a functional block diagram of a control unit of the image reading device;

FIG. 8 is a flowchart for explaining an overall sequence of operations performed for the purpose of vertical stripe determination;

FIG. 9 is a flowchart for explaining a sequence of operations in a vertical stripe determination operation performed before scanning;

FIG. 10 is a flowchart for explaining a sequence of operations in the vertical stripe determination operation performed during sheet-through reading;

FIG. 11 is a flowchart for explaining a sequence of operations in a vertical stripe cause type determination operation performed with respect to the causing matter present on the surface of the reading glass;

FIG. 12 is a flowchart for explaining a sequence of operations performed for determining, in a read image of each of the RGB components, the component in which a vertical stripe is formed, and for deciding the action to be taken according to the determination result;

FIG. 13 is a flowchart for explaining a sequence of operations performed in an automatic dirt avoidance operation; and FIG. 14 is a table that contains the types of causes of a vertical stripe which are determinable in the embodiment according to the present invention and that contains the methods of determination and the actions to be taken accordingly.

DETAILED DESCRIPTION OF THE PREFERRED EMBODIMENTS

An exemplary embodiment of an image reading device according to the present invention is described below. As described below, in the image reading device, during sheet-through reading, if vertical stripes are formed in a read image, it is determined whether the causing matter of a defective image is present on the reading glass or on the portion other than the reading glass (herein, "causing matter" is used as a generic term for dirt, a scratch, or a foreign particle that is present on the surface of the reading glass and that causes vertical stripes thereby leading to defective images during a reading operation). At the same time, the type of the causing matter is also determined (herein, the type indicates whether the causing matter is a foreign particle or dirt that can be removed by means of cleaning, or whether the causing matter is a scratch that cannot be removed by means of cleaning, or whether a foreign particle or dirt that can be removed by means of cleaning has a floating tendency or has a sticking tendency). Besides, the user is notified about the action to be taken against the result of type determination. That is, the user is notified about whether to cleaning is to be performed or a component is to be replaced. Moreover, in the case when the causing matter is tiny in size, the reading position is automatically adjusted so as to avoid the causing matter, and then reading is performed.

The embodiment of the image reading device according to the present invention is described below with reference to the accompanying drawings.

Figure 1:
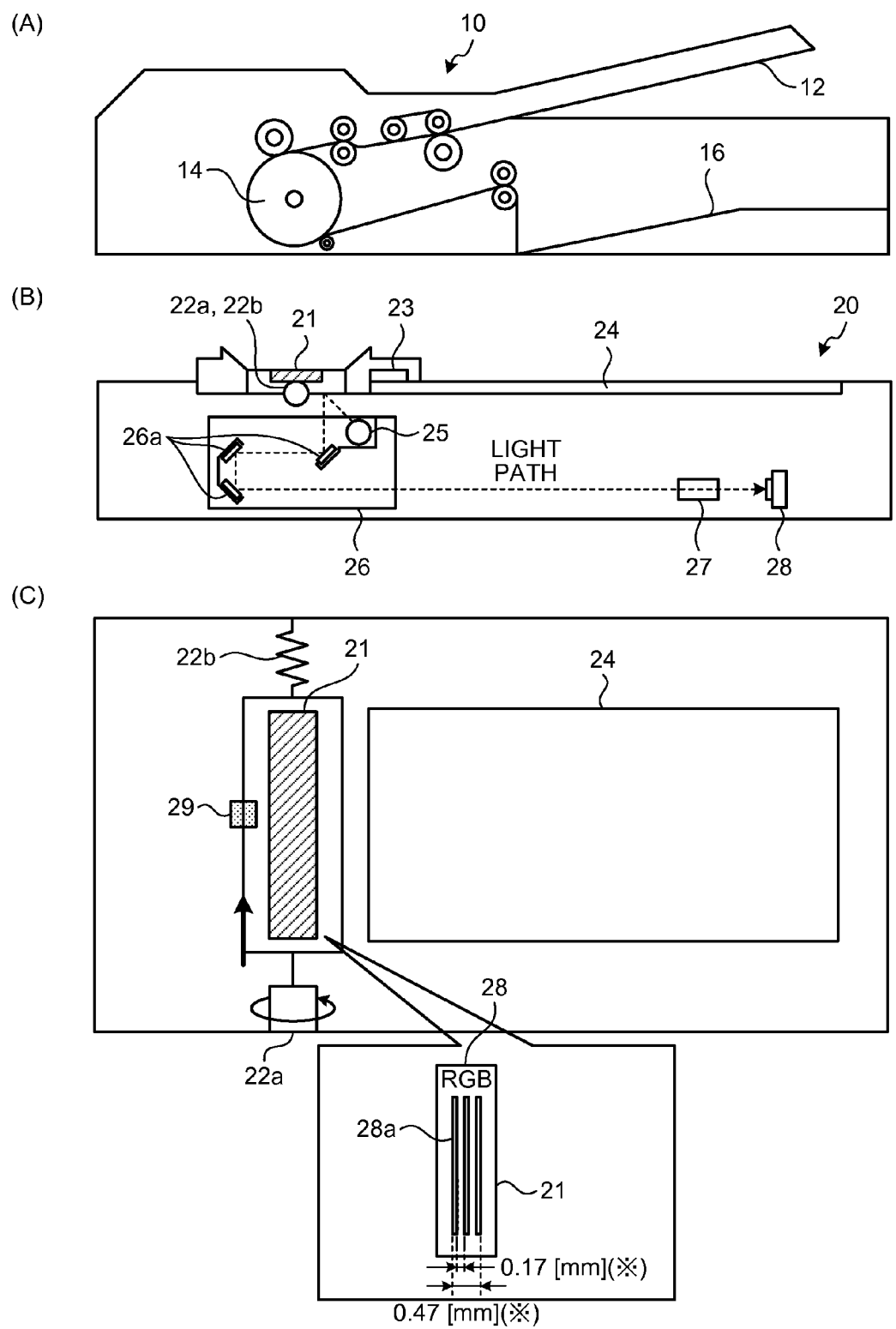
FIG. 1 is a diagram illustrating an overall structure of an image reading device according to an embodiment of the present invention.

FIG. 1 is a diagram illustrating an overall structure of the image reading device according to the embodiment of the present invention. FIG. 1(A) is a front view of a document feeder of the image reading device according to the embodiment of the present invention. FIG. 1(B) is a front view in which a scanner unit of the image reading device according to the embodiment of the present invention is illustrated in a cross-section. FIG. 1(C) is a planar view of the scanner unit illustrated in FIG. 1(B).

In the image reading device, during sheet-through reading, an original is carried in the sub-scanning direction while keeping a reading unit, which is made of a lamp 25 and mirrors 26a included in a carriage 26, fixed; and an original image is read on the surface of a reading glass 21. At that time, if any dirt is present on the surface of the reading glass 21 of a scanner unit 20, then it may lead to the generation of a defective image having vertical stripes. If a defective image is generated, the reading quality undergoes a decline. In order to resolve this issue, it becomes necessary to detect the dirt present on the surface of the reading glass 21.

In that regard, prior to reading an original, a reflected image (a read image) of the surface of the reading glass 21 is obtained by illuminating the reading glass 21 with the light of the lamp 25 and letting the reflection light pass through a plurality of mirrors 26a included in the carriage 26 and through a condenser lens 27 placed in the path of the read (reflected) light, and using a line sensor (herein, a color CCD line sensor) 28 that includes photoelectric conversion elements such as charge coupled devices (CCD). Then, it is determined whether or not vertical stripes that are continuous in the sub-scanning direction are generated in the read image. With that, it is determined whether any dirt is present on the surface of the reading glass 21. Herein, "vertical stripes" indicate linear images continuous in an original carrying direction which is the direction in which the original is carried (in this example, continuous in the sub-scanning direction).

However, by performing only this type of determination, it is not possible to distinguish whether the dirt is present on the reading glass 21 or whether the dirt is present in a continuous manner in the portion in the sub-scanning direction other than the reading glass 21. Particularly, the dirt present on the carrying rollers or a belt 14 is located on the back of the reading face of the original. Hence, that dirt does not cause vertical stripes. For that reason, it becomes necessary to distinguish between the dirt present on the surface of the reading glass and the dirt present on the portion other than the reading glass.

In that regard, in the present embodiment, the reading glass 21 is moved in a direction orthogonal to the original carrying direction that is the direction in which the original is carried (in the following explanation, the direction orthogonal to the original carrying direction is sometimes referred to as "main-scanning direction"); and reading is performed before as well as after the reading glass 21 is moved. With that, it is determined whether vertical stripes are caused due to the portion other than the reading glass 21 or due to the reading glass 21. That is, during sheet-through reading, since reading is performed by keeping the carriage 26 and the reading glass 21 fixed, if the reading glass 21 having the dirt on the surface thereof is moved and if image reading is performed, the dirt-induced position of the vertical stripes in the main-scanning direction in a read image obtained before moving the reading glass 21 is different than the dirt-induced position of the vertical stripes in the main-scanning direction in a read image obtained after moving the reading glass 21.

In contrast, when the dirt is present on the portion other than the reading glass 21 such as on the carrying rollers or the belt 14; even if the reading glass 21 is moved, the position of the vertical stripes in a read image remains the same as a matter of course.

Thus, when the reading glass 21 is moved in the main-scanning direction, if the position of vertical stripes in the read image obtained before moving the reading glass 21 is no different from the position of vertical stripes in the read image obtained after moving the reading glass 21, then it becomes possible to determine that the dirt is present on the portion other than the reading glass 21.

Meanwhile, even if it is found that formation of vertical stripes is attributed to the reading glass 21, the cause need not only be the dirt present on the surface of the reading glass 21 but can also be a scratch on the reading glass 21. In the conventional technology, although the dirt present on the reading glass 21 is detected, it is not possible to detect any scratches. Hence, by implementing only the conventional technology, it is not possible to reduce or eliminate vertical stripe images.

In the present embodiment, it is determined whether a defective image causing matter (hereinafter, simply called "causing matter") is present on the portion other than the reading glass 21 or present on the reading glass 21. Besides, the type and the size of the causing matter are also determined. Depending on the determination results, a notifying unit 300d (FIG. 7), which is made of a suitable display such as a liquid crystal liquid display, notifies the user about the following information: measures to be taken so that the causing matter present on the surface of the reading glass 21 is avoided during a reading operation; information on the need for cleaning if the causing matter cannot be avoided; and the location of the causing matter. With that, the user can easily perform vertical stripe correction.

The configuration illustrated in FIG. 1(A) includes a platen 12 and a catch tray 16. The configuration illustrated in FIG. 1(B) includes a reference white board 23 and a contact glass 24. Regarding the structure and functions of each of these constituent elements, known components are used as far as original reading devices are concerned. Hence, the explanation of those components is not given.

Given below is the schematic explanation about a determinable range of the causing matter and about the determination of the causing matter according to the present embodiment.

(i) as far as the location of the causing matter is concerned, it is determined whether the causing matter is present on the reading glass 21 or present on the portion other than the reading glass 21 such as the carrying rollers or the belt 14.

(ii) in the determination of the type of the causing matter, it is determined whether or not the causing matter present on the surface of the reading glass 21 can be removed by means of cleaning, that is, whether or not the causing matter indicates the dirt.

(iii) as far as the size of the causing matter is concerned, if it is determined at the operation at (ii) that the dirt is present, then the size of the dirt in the sub-scanning direction is determined. Then, from the size information, it is determined whether the dirt can be avoided by varying the reading position. If the dirt cannot be avoided, then a message specifying the need for cleaning is issued. Along with that, the location of the dirt on the surface of the reading glass 21 is also notified.

FIG. 2 is a diagram for explaining a means and a method for determining the location of the causing matter. FIG. 2(A) is a planar view illustrating the states of the reading glass 21 before and after being moved in the main-scanning direction. FIG. 2(B) and FIG. 2(C) are diagrams illustrating read images obtained before and after moving the reading glass 21 in the main-scanning direction.

As a cause for vertical stripe images during sheet-through reading, it is possible to state a case in which some kind of causing matter is present either on the reading glass 21 or on the portion other than the reading glass 21. Thus, in order to reduce the vertical stripe images, it is necessary to correctly determine whether or not the causing matter is present.

Prior to performing sheet-through reading, firstly, it is determined whether the causing matter is present on the reading glass 21 or present on the portion other than the reading glass 21 such as the carrying rollers or the belt 14.

As illustrated in section (1) in FIG. 2(A), firstly, without using an original, image reading is performed while keeping the carrying rollers or the belt 14 serving as a carrying unit in a non-rotating state; and a read image of the carrying rollers or the belt 14 is obtained.

At that time, as illustrated in section (1) in FIG. 2(B), if vertical stripes are formed in the read image, then it is understood that the causing matter is present either on the reading glass 21 and or on the portion other than the reading glass 21.

Then, as illustrated in section (2) in FIG. 2(A), the reading glass 21 is moved in the main-scanning direction, and image reading is performed for one more time. In order to move the reading glass 21 in the main-scanning direction, it is possible to use an arbitrary means. Herein, a reading glass moving unit 22*a* and a spring 22*b* illustrated in FIG. 1 are used to move the reading glass 21 in the main-scanning direction. For example, the reading glass moving unit 22*a* moves the reading glass 21 by a certain amount using a solenoid. Alternatively, a screw transmission mechanism can be used that mounts thereon the reading glass 21 by means of rotation and moves a fixed member 21*a* in a straight line.

At a position of the fixed member 21*a* that is opposite to the reading glass moving unit 22*a* (i.e., at an opposite-side position of the fixed member 21*a*), the spring 22*b* is disposed in such a way that the reading glass 21 can return to its home position with ease. The movement of the reading glass 21 is performed by inputting a specified amount in a control device (not illustrated) of the reading glass moving unit 22*a*. Alternatively, a reading-glass movement amount detecting unit 29 is disposed that detects the amount of movement of the reading glass 21, and movement amount control is performed by feeding back the detected amount of movement to the reading glass moving unit 22*a*. Thus, the reading glass 21 is moved using the abovementioned means; and image reading is repeated at the moved position.

In the read images obtained before and after moving the reading glass 21, if a vertical stripe has moved in the manner illustrated in section (1) and section (2) in FIG. 2(B), then it is understood that the cause of a defective image is present, that is, the causing matter is present on the surface of the reading glass 21.

On the other hand, in the read images obtained before and after moving the reading glass 21, if a vertical stripe does not move in the manner illustrated in section (1) and section (2) in FIG. 2(C), then it is understood that the cause of a defective image is not present on the surface of the reading glass 21. Thus, in this case, the cause of a defective image happens to be on the portion other than the reading glass 21 such as the carrying rollers or the belt 14.

FIG. 3 is a diagram for explaining a method implemented during sheet-through reading for detecting that the causing matter is formed during reading. FIG. 3(A) is a front view of a state before performing sheet-through reading of originals. FIG. 3(B) is a planar view in which, during sheet-through reading of originals, a document feeder 10 is illustrated in a cross-section. FIG. 3(C) is a diagram illustrating read images obtained in between carried originals during sheet-through reading.

Herein, firstly, as illustrated in FIG. 3(A), prior to performing sheet-through reading, image reading is performed while rotating the carrying rollers or the belt 14, and a read image of the carrying belt or the belt 14 is obtained in advance.

Subsequently, during sheet-through reading, after every 15 originals, a read image of the carrying rollers or the belt 14 for every 15 originals is obtained. Then, the read image of the carrying rollers or the belt 14 obtained prior to performing sheet-through reading is compared with the read images of the carrying rollers or the belt 14 obtained in between originals during sheet-through reading.

During sheet-through reading, if the causing matter is newly formed on the surface of the reading glass 21, then vertical stripes are ought to be present in the read images obtained after every subsequent 15 originals.

Thus, when the comparison of two read images indicates that the vertical stripes are identical (including the case in which the vertical stripes are closely similar), it is determined that the dirt present on the portion other than the reading glass 21 is the cause of defective images. On the other hand, when the comparison of two read images indicates that the vertical stripes are not identical, then it can be considered (or determined) that the causing matter is newly formed on the surface of the reading glass 21.

FIG. 4 is a diagram for explaining type determination of the causing matter present on the surface of the reading glass 21. FIG. 4(A) is a planar view illustrating the states of the reading glass 21 before and after being moved in the main-scanning direction. FIG. 4(B) is a diagram illustrating read images obtained before and after moving the reading glass 21 in the main-scanning direction.

If a vertical stripe is formed in a read image and if it is determined that the reading glass 21 is the cause of the vertical stripe, then type determination is performed with respect to the causing matter of the vertical stripe and it is determined whether or not the causing matter can be removed by means of cleaning the reading glass 21. The causing matter that cannot be removed by means of cleaning points to a scratch on the reading glass 21 or a crack in the reading glass 21 that requires replacement. As far as the causing matter such as the dirt or a foreign particle that can be removed by means of cleaning is concerned, it is determined whether the causing matter points to paper powder or dust having a weak presence with respect to the reading glass 21 (i.e., having a floating tendency) or whether the causing matter points to ink or eraser dust having a strong presence with respect to the reading glass 21 (i.e., having a sticking tendency).

Herein, the determination of whether the causing matter has a floating tendency or has a sticking tendency is performed by comparing the amount of movement of the reading glass 21 with the amount of shift in a vertical stripe.

Assume that X represents the amount of movement of the reading glass 21 when moved by the reading glass moving unit 22*a* from the position illustrated in section (1) in FIG. 4(A) to the position illustrated in section (2) in FIG. 4(B). Moreover, assume that Y represents the amount of shift in the vertical stripe, which is present in the reading image, from the position illustrated section (1) in FIG. 4(B) to the position illustrated section (2) in FIG. 4(B); and is calculated by a shift amount calculating unit 305 of a control unit 30 (FIG. 7). If the amount of movement of the reading glass 21 is identical with the amount of shift in the vertical stripe (herein, being identical includes being closely similar; more particularly, if X-Y is smaller than a threshold value), then it is determined that the causing matter has a sticking tendency. On the other hand, if the amount of movement of the reading glass 21 is not identical with the amount of shift in the vertical stripe (that is, if X-Y is equal to or greater than the threshold value), then it is determined that that causing matter has a floating tendency.

When it is determined that the causing matter has a sticking tendency because the amount of movement of the reading glass 21 is identical with the amount of shift in the vertical stripe, it is then determined whether the causing matter can be removed by means of cleaning.

Herein, whether the causing matter having a sticking tendency can be removed by means of cleaning is determined by referring to the pixel density (the pixel value) of the vertical stripe. That is because, in a read image, generally ink is closer to black color and a scratch is closer to white color. There, for example, 128/255[pixel value] is set to be the threshold value, and it is determined whether or not the pixel value of the vertical stripe is equal to or greater than the threshold value. If the pixel value of the vertical stripe is equal to or greater than the threshold value, then the causing matter is closer to white color and is determined to be a scratch that is not removable by means of cleaning. On the other hand, if the pixel value of the vertical stripe is smaller than the threshold value, then the causing matter is closer to black color and is determined to be an ink blot that is removable by means of cleaning.

Based on the determination result, when it is determined that the dirt is present, size determination is performed. On the other hand, when it is determined that a scratch is present, a message for prompting the user to perform component replacement is issued.

Figure 5:
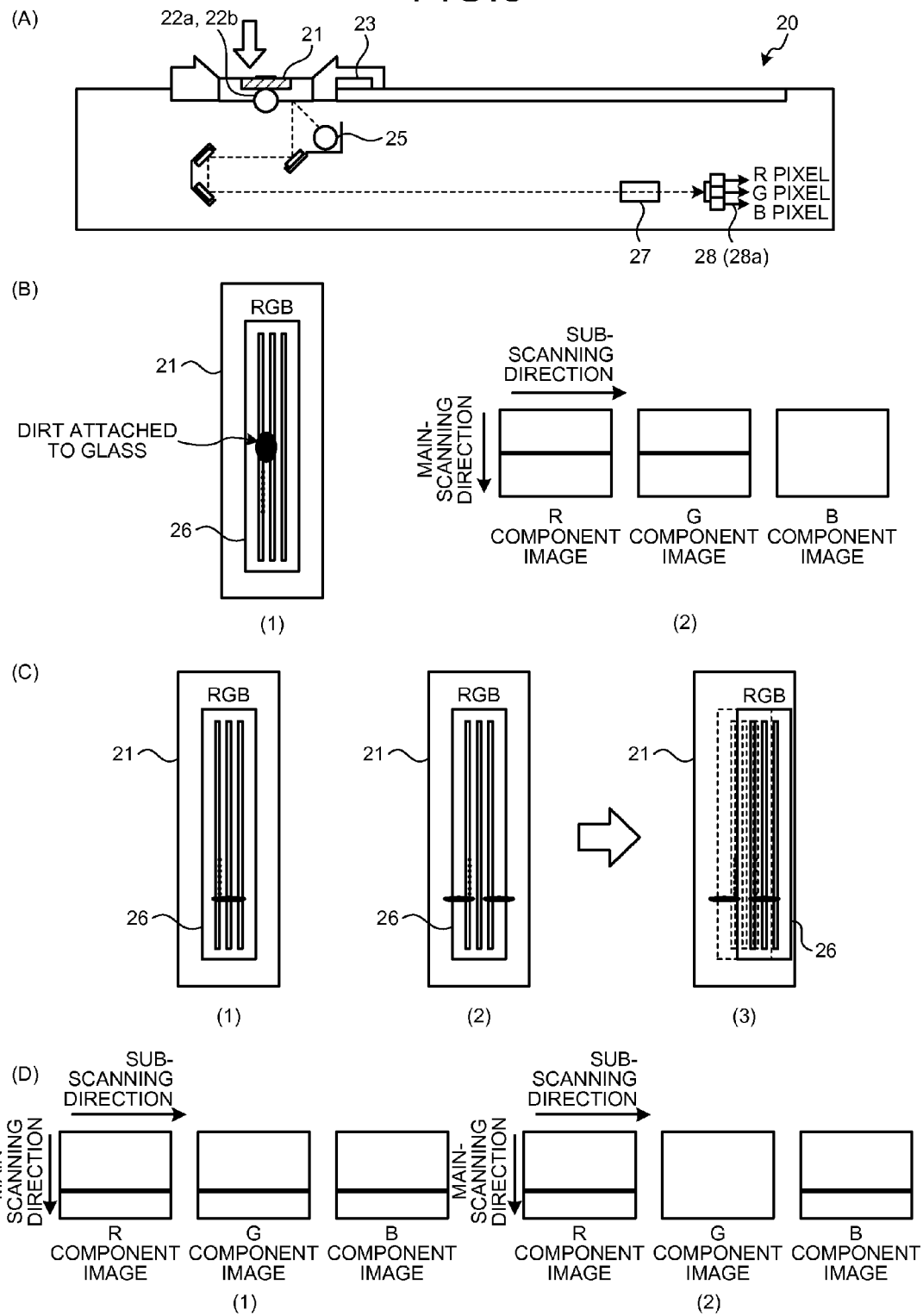
FIG. 5 is a diagram for explaining a case in which, with respect to the dirt that is present on the surface of the reading glass and that is determined to be the causing matter in the type determination performed with reference to FIG. 4, the size and the position of the dirt are also determined.

FIG. 5 is a diagram for explaining the case in which, with respect to the dirt that is present on the surface of the reading glass 21 and that is determined to be the causing matter in the type determination performed with reference to FIG. 4, the size and the position of the dirt are also determined.

This determination is performed by referring to a vertical stripe formed in each of the RGB components of the color CCD line sensor 28 having a plurality of lines.

Firstly, the explanation is given about dirt determination in the main-scanning direction.

FIG. 5(A) is a planar view of the scanner unit 20 identical to FIG. 1(B). Herein, the size and the position of the dirt in the main-scanning direction are determined using the scanner unit 20. In section (1) in FIG. 5(B) is illustrated the positional relationship between the dirt present on the reading glass 21 and the color CCD line sensor 28, while in section (2) in FIG. 5(B) are illustrated read images that appear in the RGB components corresponding to that positional relationship. In FIG. 5(C), section (1) and section (2) are identical to section (1) in FIG. 5(B); while in section (3) in FIG. 5(C) is illustrated a state in which the carriage 26 is moved in the direction of the B component from the position in section (2) in FIG. 5(C). In section (1) and section (2) in FIG. 5(D) are respectively illustrated the read images corresponding to section (1) and section (2) in FIG. 5(C).

Firstly, the explanation is given about determining the size and the position of the dirt in the main-scanning direction.

As illustrated in section (2) in FIG. 5(B), the dirt present on the surface of the reading glass 21 along the main-scanning direction is reflected as it is in a read image. That is, the thickness of the vertical stripe in the read image represents the size of the dirt present on the surface of the reading glass 21 along the main-scanning direction; and the position of the vertical stripe in the main-scanning direction represents the position of the dirt present on the surface of the reading glass 21 in the main-scanning direction. At the time of issuing a message for prompting the user to perform cleaning, this information is notified as the location of the dirt in the main-scanning direction.

Given below is the explanation of determining the size and the position of the dirt in the sub-scanning direction.

In FIG. 5(C), section (1) as well as section (2) is a planar view of the CCD line sensor 28 exhibiting the dirt present on the reading glass 21. In section (1) in FIG. 5(C) is illustrated a case in which the dirt present on the reading glass 21 cuts across the RGB components of the CCD line sensor 28. In section (2) in FIG. 5(C) is illustrated a case in which the dirt present on the reading glass 21 lies on the R and B components of the CCD line sensor 28. In FIG. 5(C), section (3) is a planar view of the CCD line sensor 28 in a state in which the carriage 26 is moved in the direction of the B component. In section (1) in FIG. 5(D) is illustrated read images (vertical stripe images) of the RGB components of the CCD line sensor 28 in the state illustrated in section (1) in FIG. 5(C). In section (2) in FIG. 5(D) are illustrated read images (vertical stripe images) in the state illustrated in section (2) in FIG. 5(C).

In the present embodiment, the determination is performed depending on whether or not a vertical stripe is formed in the read image of each of the RGB components of the color CCD line sensor 28.

Herein, for example, the explanation is given for an example in which the color CCD line sensor 28 has three line sensors having the resolution of 600 [dpi] and having the line sensor interval of 4 [dot].

In the color CCD line sensor 28, a single line has the width of 25.4 [mm]/600 [dpi]≅0.0423 [mm]. Besides, in the color CCD line sensor 28, each line 28a of pixels is physically apart from each other. In this particular case, according to (4 dot in between lines 29a)(25.4 [mm]/600 [dpi])*4 [dot]≅0.17 [mm], the distance between each line 28a of the color CCD line sensor 28 becomes equal to about 0.17 [mm].

Thus, a physical distance of 0.17 [mm] is maintained among the three lines 28a of the color CCD line sensor 28. In the present embodiment, by making use of this fact, the size (length) in the sub-scanning direction of the dirt present on the surface of the reading glass 21 is determined.

The paper powder, which is a representative example of the dirt, is generally said to have the particle size of about 0.001 [mm]. In the case when a vertical stripe is caused due to the paper powder, there is a possibility that the vertical stripe disappears due to shifting of the position of the carriage 26. On the other hand, for example, in the case when a vertical stripe is caused due to hair; since the hair are said to have the thickness of about 0.07 [mm], there is no comparison with the paper powder. In this way, it becomes possible to determine the size of the dirt having a floating tendency.

The determination includes, for example, the detection of the presence or absence of a vertical stripe in the read images of the R component, the G component, and the B component in that order. If a vertical stripe is formed, instead of issuing a message from the very start to specify the need for cleaning, position adjustment of the carriage 26 is performed and reading is again performed at the position at which the reading unit has moved.

The reason for that is as follows. As a result of performing the reading for one more time, if no vertical stripe is formed in the read image that is obtained, it means that the position adjustment of the carriage 26 resulted in achieving automatic avoidance of the dirt. Then, the subsequent reading can be performed at the adjusted position so that vertical stripes can be prevented from formed.

Thus, automatic scanning for avoiding a vertical stripe is performed for a plurality of times, such as for three times; and if the vertical stripe does not disappear even after performing the scanning for three times, only then a message specifying the need for cleaning is issued for the first time.

While performing the reading again, as far as the direction of movement of the carriage 26 is concerned, when a vertical stripe is formed in the R component, the direction of movement is in the direction of the B component; and when a vertical stripe is formed in the G component or the B component, the direction of movement is in the direction of the R component.

Every time, the amount of movement of the carriage 26 is as follows.

As illustrated in FIG. 1, the length of the entire CCD line sensor 28 (the length in the sub-scanning direction) becomes equal to (25.4 [mm]/600 [dpi])*11 [dot]≅0.47 [mm] (a first determination value).

Thus, every time, the amount of movement of the carriage 26 is equal to or greater than 0.47 [mm].

If a vertical stripe is formed in the read image of each of the RGB components, then it can be said that the dirt equal to or greater than 0.47 [mm] is present as illustrated in section (1) in FIG. 5(C). In that case, during the abovementioned position adjustment of the carriage 26, it becomes a repetition of the movement of the carriage 26 in the direction of the B component and the direction of the R component. Thus, by performing the movement for about three times, it is highly likely that automatic avoidance of the dirt is avoided.

Moreover, as illustrated in section (2) in FIG. 5(C), if a vertical stripe is formed in the R component as well as in the B component, then it indicates that the dirt is present on either side of the reading glass 21. In this case too, it is highly likely that the movement of the carriage 26 is repeated in a reciprocating manner.

In this way, in the case when vertical stripes are formed in the RGB components and in the case when vertical stripes are formed in the RB components; automatic scanning for avoiding the vertical stripes is not performed, and a message specifying the need for cleaning is issued from the very start. At that time, the position of the dirt on the surface of the reading glass 21 is also notified. The position of the dirt can be understood from the thickness and the sub-scanning direction position of the vertical stripe in the read image.

Further explanation about automatic avoidance of the dirt achieved by the movement of the carriage 26 is given below with reference to FIGS. 6(A) to 6(C).

In each of FIGS. 6(A) to 6(C), section (1) illustrates the positional relationship between the dirt present on the reading glass 21 and the line sensor (the color CCD sensor) 28. Moreover, in each of FIGS. 6(A) to 6(C), section (2) illustrates reading images obtained in the state of corresponding section (1). Furthermore, in FIGS. 6(A) to 6(C), section (3) illustrates a state obtained by moving the carriage 26 from the state in corresponding section (1).

As illustrated in section (1) in FIG. 6(A), when a vertical stripe is formed in only one component of the RGB components, the dirt is so tiny that it cannot be detected from more than a single line 28a of the line sensor 28. For that reason, if the position of the carriage 26 is changed in the direction opposite to the component in which the dirt is present, it becomes possible to automatically avoid the dirt.

Herein, it is assumed that a vertical stripe is formed in the R component. In that case, section (2) in FIG. 6(A) illustrates the read images in the RGB components, and section (3) in FIG. 6(A) indicates that the carriage 26 is moved in the direction opposite to the component in which the vertical stripe is formed (in this example, since a vertical stripe is formed in the R component, the carriage 26 is moved in the direction of the G component). In contrast, if a vertical stripe is formed in only the G component, then the carriage 26 is moved in the direction of the R component.

For example, as illustrated in sections (1) and (2) in FIG. 6(B), if a vertical stripe is formed in only the GB components (identical to the case in which a vertical stripe is formed in only the RG components), it is considered that the dirt cuts across two neighboring components.

In this case, the size of the dirt in the sub-scanning direction is equal to at least (25.4 [mm]/600 [dpi])*6 [dot]≅0.25 [mm] (a second determination value).

Thus, as illustrated in section (3) in FIG. 6(B), the carriage 26 is moved in the direction opposite to the two components in which the vertical stripe is formed. Herein, depending on the state of existence of the dirt, the position adjustment of the carriage 26 may enable achieving automatic avoidance of the dirt.

However, it is not always the case that the dirt is tiny in size. Hence, even if automatic avoidance of the dirt could be achieved, there are users who still prefer to have the cleaning done. In that regard, in the case when a vertical stripe is generated in the RG components or in the GB components and when automatic avoidance of the dirt can be achieved, that is, in the case when the size of the dirt in the sub-scanning direction is between the first determination value and the second determination value; the user is asked whether or not to perform cleaning. If the user instructs to perform cleaning, then the user is notified also about the location of the dirt.

Meanwhile, if moving the carriage 26 does not result in making the vertical stripe disappear, then the carriage 26 is moved further in the same direction. However, if the vertical stripe does not disappear irrespective of moving the carriage 26 for a predetermined number of times such as for three times, then the notifying unit 300d notifies the user about a message specifying the need for cleaning and about the location of the dirt.

As illustrated in section (1) in FIG. 6(C), in the case when a vertical stripe is formed in each of the RGB components and when each vertical stripe has a different main-scanning direction, it indicates that the dirt is present at two or more locations. In such a case, the presence of dirt is determined in the order of R, G, and B components and the carriage 26 is moved accordingly. If moving the carriage 26 does not result in making the vertical stripes disappear, then the notifying unit 300d notifies the user about a message specifying the need for cleaning and about the locations of the dirt.

Given below is the explanation of an overall sequence of operations performed for the purpose of vertical stripe determination described above.

FIG. 7 is a functional block diagram of a control unit of the image reading device. Herein, regarding the operations illustrated in flowcharts in FIGS. 8 to 13, except for the manual operations such as replacing a component or doing the cleaning task, the operations are performed by the control unit and the constituent elements thereof.

In the image reading device, as illustrated in FIG. 7, the control unit 30 that controls the entire device (or a dedicated control unit for performing vertical stripe determination and operations) is a computer that is configured with a central processing unit (CPU) 300, a read only memory (ROM) 300a, and a random access memory (RAM) 300b. This computer reads computer programs and implements the following functional units.

That is, the control unit 30 includes a vertical stripe formation determining unit 301, a vertical stripe position determining unit 302, a causing matter location determining unit 303, a vertical stripe density determining unit 304, the shift amount calculating unit 305, a causing matter type determining unit 306, a vertical stripe avoidance action determining unit 307, a size determining unit 308, and a notification control unit 309.

The vertical stripe formation determining unit 301 determines whether or not a read image includes vertical stripes that are linear images continuous in the original carrying direction (in this example, the sub-scanning direction).

If a vertical stripe is formed, then the vertical stripe position determining unit 302 determines whether or not the position of the vertical stripe in the read image obtained before moving the reading glass 21 is identical to the position of the vertical stripe in the read image obtained after moving the reading glass 21. That is, the vertical stripe position determining unit 302 determines whether or not the position of the vertical stripe has shifted.

Based on the determination performed by the vertical stripe position determining unit 302 about whether or not the position of the vertical stripe in the read image obtained before moving the reading glass 21 is identical to the position of the vertical stripe in the read image obtained after moving the reading glass 21, the causing matter location determining unit 303 determines the location of the causing matter, that is, determines whether the causing matter is present on the reading glass 21 or on an original carrying member (such as the carrying rollers or the belt 14).

The vertical stripe density determining unit 304 determines the pixel density, that is, the pixel value of a vertical stripe in, for example, the gradation of 0 to 255; and determines whether the pixel density of the vertical stripes exceeds a threshold value.

The shift amount calculating unit 305 calculates the amount of shift in a vertical stripe in the read images obtained before and after moving the reading glass 21 in the main-scanning direction.

When the causing matter location determining unit 303 determines that the causing matter is present on the reading glass 21, the causing matter type determining unit 306 determines the type of the causing matter such as whether the causing matter is a scratch or an entity such as dirt or a foreign particle and whether the causing matter has a sticking tendency or a floating tendency. That is, based on the density determination result obtained by the vertical stripe density determining unit 304, the causing matter type determining unit 306 determines that the causing matter exceeding a predetermined density threshold value is a scratch and determines that the causing matter not exceeding the predetermined density threshold value is dirt. Moreover, based on the amount of movement of the reading glass 21 and based on the calculation performed by the shift amount calculating unit 305 about whether the amount of shift in the vertical stripe in the read image obtained before moving the reading glass 21 in the main-scanning direction is identical to the amount of shift in the vertical stripe in the read image obtained after moving the reading glass 21 in the main-scanning direction; the causing matter type determining unit 306 determines whether the causing matter has a sticking tendency or a floating tendency with respect to the reading glass 21.

Based on the determination result obtained by the size determining unit 308, the vertical stripe avoidance action determining unit 307 determines whether or not the carriage 26 can be moved and the position of the reading unit can be adjusted.

The size determining unit 308 determines the size and the position of the causing matter.

When the vertical stripe avoidance action determining unit 307 determines that the position of the reading unit is not to be adjusted, or when the causing matter type determining unit 306 determines that the causing matter is a scratch or determines that the causing matter has high a sticking tendency or determines that the causing matter is something else (such as a foreign particle); the notification control unit 309 controls the notifying unit 300d to notify the user about those details.

FIG. 8 is a flowchart for explaining an overall sequence of operations performed for the purpose of vertical stripe determination described above.

In the present embodiment, a vertical stripe determination operation is performed not only before performing sheet-through reading but also during sheet-through reading. Firstly, the vertical stripe determination operation is performed before performing sheet-through reading (S101). In the vertical stripe determination operation performed before performing sheet-through reading, the causing matter present on the surface of the reading glass 21 is determined and removed before performing sheet-through reading. After completing the vertical stripe determination operation performed before performing sheet-through reading, a single original is carried and sheet-through reading is performed (S102) and the vertical stripe determination operation is performed during sheet-through reading (S103). In the vertical stripe determination operation performed during sheet-through reading, the causing matter that is newly formed is determined and removed.

Meanwhile, it is possible to think that, even if a vertical stripe is formed, the user may not think determination and classification of the vertical stripe to be necessary. In that regard, the user is enables to specify whether or not to perform type determination of vertical stripes.

The operations at S102 and S103 are performed in a repeated manner until no more carried original is remaining (No at S104). When no more carried original is remaining (Yes at S104), the operations are ended and the control unit 30 switches to a standby state.

FIG. 9 is a flowchart for explaining a sequence of operations in the vertical stripe determination operation performed before scanning.

As described above, before performing sheet-through reading, a read image of the carrying rollers or the belt 14 is obtained, and it is determined whether or not the causing matter is present on the surface of the reading glass 21.

Firstly, a read image of the carrying rollers or the belt 14 is obtained (S201). Then, the vertical stripe formation determining unit 301 determines whether or not a vertical stripe image is formed in the read image (S202). If the vertical stripe formation determining unit 301 determines that a vertical stripe image is formed in the read image (Yes at S202), then the reading glass 21 is moved in the main-scanning direction (S203). Subsequently, the vertical stripe position determining unit 302 determines whether or not the position of the vertical stripe in the read image has shifted (S204). If it is determined that the main-scanning position of the vertical stripe in the read image has shifted (Yes at S204), then the causing matter location determining unit 303 determines that the causing matter of the vertical stripe is present on the surface of the reading glass 21. Then, the system control proceeds to a vertical stripe cause type determination flowchart described later with reference to FIG. 11 (S207). Based on the result of the vertical stripe cause type determination flowchart described with reference to FIG. 11, the vertical stripe avoidance action determining unit 307 determines whether or not formation of the vertical stripe can be avoided by moving the carriage 26 and adjusting the reading position (S208). If the vertical stripe avoidance action determining unit 307 determines that formation of the vertical stripe cannot be avoided by moving the carriage 26 and adjusting the reading position (No at S208), it notifies the user about the same. Then, the job is ended and the components are cleaned or replaced (S206). That marks the end of the vertical stripe determination operation performed before sheet-through reading.

Meanwhile, if the vertical stripe avoidance action determining unit 307 determines that formation of the vertical stripe can be avoided by adjusting the reading position (Yes at S208), then the carriage 26 is moved and the reading position is adjusted. Then, at the adjusted position and in the state in which the read image does not include any vertical stripes, the carrier rollers or the belt 14 is rotated and a read image at that time is obtained (S209). That marks the end of the vertical stripe determination operation performed before sheet-through reading.

Meanwhile, if it is determined that the main-scanning position of the vertical stripe in the read image is the same, that is, has not shifted (No at S204), then the causing matter location determining unit 303 determines that the cause of the vertical stripe is present on the portion other than the reading glass 21 (S205). Then, the job is ended and the components are cleaned or replaced (S206). That marks the end of the vertical stripe determination operation performed before sheet-through reading.

Moreover, if the vertical stripe formation determining unit 301 determines that no vertical stripe is formed in the read image (No at S202), the carrying rollers or the belt 14 is rotated and a read image thereof is obtained (S209). That marks the end of the vertical stripe determination operation performed before sheet-through reading.

FIG. 10 is a flowchart for explaining a sequence of operations in the vertical stripe determination operation performed during sheet-through reading.

During sheet-through reading, a read image of the carrying rollers or the belt 14 is obtained in between carried originals (S301). Then, the vertical stripe formation determining unit 301 determines whether a vertical stripe is present in the read image obtained in between the sheet of the carried original being subjected to sheet-through reading and the sheet of the next carried original (S302). If it is determined that a vertical stripe is formed in the read image obtained between two sheets of carried originals (Yes at S302), then the vertical stripe position determining unit 302 determines whether that read image is identical to the read image obtained at S209 illustrated in FIG. 9 (i.e., identical to the read image obtained by rotating the carrying rollers or the belt 14) (S303). If the two read images are determined to be identical (Yes at S303), it is determined that the dirt is already present on the portion other than the reading glass 21. Then, the operations are ended without any further processing.

On the other hand, if the two read images are determined to be not identical (No at S303), then the causing matter location determining unit 303 determines that the dirt is newly formed on the reading glass 21 during sheet-through reading. Then, in an identical manner to the pre-scanning operations, the system control proceeds to the vertical stripe cause type determination flowchart described later with reference to FIG. 11 for the purpose of determining the type/size of the dirt (the causing matter) (S304). Depending on that determination result, if formation of the vertical stripe can be avoided by adjusting the reading position (Yes at S305), the operations are ended.

On the other hand, if formation of the vertical stripe cannot be avoided by adjusting the reading position (No at S305); then the job is ended and the reading glass 21 is cleaned or replaced (S306). That marks the end of the operations.

FIG. 11 is a flowchart for explaining a sequence of operations in a vertical stripe cause type determination operation performed with respect to the causing matter present on the surface of the reading glass 21.

Firstly, the causing matter type determining unit 306 of the control unit 30 determines whether or not the amount of movement of the reading glass 21 is identical to the amount of shift in a vertical stripe formed in the read images obtained before and after the reading glass 21 is moved in the main-scanning direction (S401). If the amount of movement is identical to the amount of shift (Yes at S401), then the causing matter type determining unit 306 determines that the causing matter has a sticking tendency (such as the dirt or a scratch) (S402). Then, the vertical stripe density determining unit 304 determines whether or not the pixel density of the vertical stripe is equal to or smaller than a predetermined threshold value (S403). If the pixel density of the vertical stripe is equal to or smaller than a predetermined threshold value (Yes at S403), then the causing matter type determining unit 306 determines that the causing matter of the vertical stripe is dirt which can be removed by means of cleaning (S404). Then, the system control proceeds to a vertical stripe occurring component determination operation explained with reference to FIG. 12 (S405). That marks the end of the operations.

Meanwhile, if the vertical stripe density determining unit 304 determines that the pixels of the vertical stripe is not equal to or smaller than the predetermined threshold value (No at S403), then the causing matter type determining unit 306 considers that a scratch or a crack is present on the surface of the reading glass 21 thereby leading to deterioration of the state and determines that the scratch or the crack cannot be removed by means of cleaning (S406). Hence, the job is stopped and the notifying unit 300d is used to notify (in this case, display) a message on, for example, a liquid crystal display (LCD) specifying the need for replacing the reading glass (S407). That marks the end of the operations.

Meanwhile, if the vertical stripe position determining unit 302 of the control unit 30 determines that the amount of movement of the reading glass 21 is not identical to the amount of shift in the vertical stripe in the read images as calculated by the shift amount calculating unit 305 (No at S401), then the causing matter type determining unit 306 determines that the causing matter having a floating tendency, such as a foreign particle, is causing the vertical stripe (S408). Then, the system control proceeds to the vertical stripe occurring component determination operation explained with reference to FIG. 12 (S409). That marks the end of the operations.

FIG. 12 is a flowchart for explaining a sequence of operations performed for determining, in a read image of each of the RGB components, the component in which a vertical stripe is formed; and for deciding the action to be taken according to the determination result.

Firstly, the vertical stripe formation determining unit 301 determines the presence or absence of a vertical stripe in each of the RGB components (S501). If it is determined that vertical stripes are formed in all of the RGB components or in the RB components (RGB/RB at S501), then the vertical stripe avoidance action determining unit 307 determines that the formation of the vertical stripe cannot be avoided by adjusting the position of the reading unit; and the notification control unit 309 controls the notifying unit 300d to display a message specifying the need for cleaning and specifying the location of the dirt (S502).

On the other hand, if the vertical stripe formation determining unit 301 determines that vertical stripes are formed in the RG components or in the GB components (RG/GB at S501), then an input unit 300c (FIG. 7) that is a receiving unit is used to receive an instruction from the user about whether or not to perform cleaning (S503). If the user instructs to "perform cleaning" (Yes at S503), then the notifying unit 300d displays a message specifying the need for cleaning and specifying the location of the dirt (S504). That marks the end of the operations. However, if the user does not instruct to "perform cleaning" (No at S503), then the system control proceeds to an automatic dirt avoidance operation flowchart described later with reference to FIG. 13 (S505). That is followed by automatic avoidance of the dirt, and the operations are ended.

Meanwhile, if the vertical stripe formation determining unit 301 determines that a vertical stripe is formed in only one of the RGB components (R/G/B at S501); then that vertical stripe is tiny in size. Hence, the vertical stripe avoidance action determining unit 307 determines that the formation of the vertical stripe can be avoided by adjusting the position of the reading unit, and the system control proceeds to the automatic dirt avoidance operation flowchart described below with reference to FIG. 13 (S506). That is followed by automatic avoidance of the dirt, and the operations are ended.

FIG. 13 is a flowchart for explaining a sequence of operations performed in the automatic dirt avoidance operation.

Herein, depending on whether or not a vertical stripe is formed in the read image of each line component of the three line (CCD) sensor 28, the size and the position of the vertical stripe is determined and the action to be taken is decided.

That is, for example, the vertical stripe formation determining unit 301 firstly determines whether or not a vertical stripe is formed in the R component (S601). If it is determined that a vertical stripe is formed in the R component (Yes at S601), then the vertical stripe avoidance action determining unit 307 moves the carriage 26 to move the reading unit in the direction of the B component (S602). Then, a read image of the reading glass 21 is obtained for one more time (S603). If the vertical stripe formation determining unit 301 determines that the vertical stripe has disappeared from the read image that has been obtained again (Yes at S604), then the moved position is set as the reading position (S605). That marks the end of the operations.

However, if the vertical stripe formation determining unit 301 determines that the vertical stripe has not disappeared from the read image that has been obtained again (No at S604), then the vertical stripe avoidance action determining unit 307 moves the carriage 26 for a predetermined number of times such as for three times. Irrespective of that, if the vertical stripe does not disappear from the read image (Yes at S610), then the vertical stripe avoidance action determining unit 307 determines that automatic avoidance of the dirt is not possible, and the notifying unit 300d display a message specifying the need for cleaning (S611). Moreover, the notifying unit 300d also displays the position of the dirt on the surface of the reading glass 21 (S612). That marks the end of the operations.

Meanwhile, if it is determined that no vertical stripe is formed in the R component (No at S601), then the vertical stripe formation determining unit 301 determines whether or not a vertical stripe is formed in the G component (S606). If it is determined that a vertical stripe is formed in the G component (Yes at S606), then the carriage 26 is moved so that the reading unit moves in the direction of the R component (S607).

Then, the operations from S603 onward are performed. That marks the end of the operations.

Meanwhile, if the vertical stripe formation determining unit 301 determines that no vertical stripe is formed in the G component (No at S606); then the vertical stripe formation determining unit 301 determines whether or not a vertical stripe is formed in the B component (S608). If it is determined that a vertical stripe is formed in the B component (Yes at S608), then the carriage 26 is moved so that the reading unit moves in the direction of the R component (S609). Then, the operations from S603 onward are performed. That marks the end of the operations.

However, if the vertical stripe formation determining unit 301 determines that no vertical stripe is formed in the B component (No at S606); then the system control proceeds to S603 and the operations therefrom are performed. That marks the end of the operations.

As described above, during this operation, the vertical stripe formation determining unit 301 determines the presence of a vertical stripe in the R, G, and B components in that order. When a vertical stripe is formed, the position of the carriage 26 is adjusted in the direction opposite to the direction of the component in which the vertical stripe is formed. Then, reading is performed again at the adjusted position of the carriage 26, and it is determined whether or not the vertical stripe has disappeared. If it is determined that the vertical stripe has disappeared, then it means that adjusting the position of the carriage 26 enabled achieving automatic avoidance of the dirt without having to stop the job and without having to clean the reading glass 21.

As described already, if the vertical stripe does not disappear even after performing position adjustment of the reading unit by means of moving the carriage 26 as well as reading the read image again for three times, the vertical stripe avoidance action determining unit 307 determines that automatic avoidance of the dirt is not possible and stops the job. Moreover, the notifying unit 300d issues to the user a message specifying the need for cleaning. Apart from the message, the notifying unit 300d notifies the user also about the position of the dirt. Herein, regarding the position of the dirt present on the surface of the reading glass 21, the position in the main-scanning direction is understood from the thickness of the vertical stripe, and the position in the sub-scanning direction can be determined from the position in the sub-scanning direction of the read image.

FIG. 14 is a table that contains the types of causes of a vertical stripe which are determinable in the embodiment according to the present invention and that contains the methods of determination and the actions to be taken accordingly.

Regarding the determination of the position ("location" in FIG. 14) of the occurrence factor of dirt that causes a vertical stripe image; firstly, I. In the Determination Operation Performed Before Performing Original Scanning (i) upon comparing a read image obtained before moving the reading glass in the main-scanning direction with a read image obtained after moving the reading glass in the main-scanning direction, if the position of the vertical stripe in the read images has shifted in the direction of movement of the reading glass, that is, shifted in the main-scanning direction; then the location of the causing matter is determined to be on the reading glass. As far as the action to be taken in this case is concerned, the type and the size of the causing matter are determined, and automatic avoidance of the dirt is achieved. When automatic avoidance of the dirt is not possible, a notification about the same is issued.

(ii) upon comparing a read image obtained before moving the reading glass in the main-scanning direction with a read image obtained after moving the reading glass in the main-scanning direction, if the position of the vertical stripe has not shifted; then the causing matter is determined to be present on the portion other than the reading glass. As far as the action to be taken in this case is concerned, the user is prompted to check the causing matter present on the portion other than the reading glass.

II. In the Determination Operation Performed During Original Scanning (i) upon comparing a read image in which is captured the carrying belt or the carrying rollers in the rotating state of the carrying belt and which is obtained before scanning with a read image in which is captured the carrying belt and which is obtained in between two originals during scanning, if the read images are not identical; then the location (whereabouts) of the causing matter is determined to be on the reading glass. As far as the action to be taken in this case is concerned, the type and the size of the causing matter are determined, and automatic avoidance of the dirt is achieved or a notification is issued.

(ii) upon comparing a read image in which is captured the carrying belt in the rotating state and which is obtained before scanning with a read image in which is captured the carrying belt and which is obtained in between two originals during scanning, if the read images are identical; then the location (whereabouts) of the causing matter is determined to be on the portion other than the reading glass. As far as the action to be taken in this case is concerned, since there is no effect on the read image during sheet-through reading, no action is taken.

III. Regarding the Types of the Causing Matter, (i) upon obtaining a read image before moving the reading glass and obtaining a read image after moving the reading glass, if the amount of movement of the reading glass is identical to the amount of shift in the vertical stripe present in the read images and if the density of the vertical stripe is equal to or greater than a predetermined threshold value; then it is determined that the causing matter has a sticking tendency and points to the dirt that is removable. As far as the action to be taken in this case is concerned, the size of the dirt is determined and accordingly it is determined whether or not cleaning is required.

(ii) upon obtaining a read image before moving the reading glass and obtaining a read image after moving the reading glass, if the amount of movement of the reading glass is identical to the amount of shift in the vertical stripe present in the read images and if the density of the vertical stripe is smaller than a predetermined threshold value; then it is determined that the causing matter has a sticking tendency and points to the dirt that is not removable. As far as the action to be taken in this case is concerned, a message is issued to prompt the user to replace the reading glass.

(iii) upon obtaining a read image before moving the reading glass and obtaining a read image after moving the reading glass, if the amount of movement of the reading glass is not identical to the amount of shift in the vertical stripe present in the read images; then it is determined that the causing matter has a floating tendency (such as a foreign particle or the dirt).

As far as the action to be taken in this case is concerned, the size of the foreign particle or the dirt is determined and accordingly it is determined whether or not cleaning is required.

Regarding the determination of the size of the causing matter, (i) from the thickness of the vertical stripe present in a read image and from the position of the vertical stripe in the main-scanning direction, the size and the location of the dirt in the main-scanning direction is determined. As far as the action to be taken in this case is concerned, at the time of issuing a message specifying the need for cleaning, the size and the position of the dirt in the main-scanning direction is notified.

(ii) the presence or absence of the vertical stripe, which is present in a read image, is determined in each of the RGB components of a three line sensors.

In this way, the size and the location of the causing matter in the sub-scanning direction is determined. As far as the action to be taken in this case is concerned, the carriage is moved in the sub-scanning direction for a certain number of times as an attempt to achieve automatic avoidance of the dirt. In case automatic avoidance of the dirt is not possible, a message specifying the need for cleaning is issued along with the notification of the position and the size of the dirt in the sub-scanning direction.

Thus, according to the embodiment, in addition to the effect of the present invention, the following function effect can also be achieved.

(1) In the present embodiment, the user is enabled to specify whether or not to perform causing matter location determination using a causing matter location determining unit. As a result, as compared to the case in which causing matter location determination is performed every time printing is performed, it becomes possible to enhance the user-friendliness.

(2) Conventionally, during sheet-through reading, a printed material is used to determine whether or not the dirt is newly formed on the surface of the reading glass. Hence, it becomes necessary to print the content of that printed material for one more time, which is unfriendly toward the user. In contrast, in the present embodiment, in order to detect the causing matter during sheet-through reading, a read image of the carrying belt and the carrying rollers is used. As a result, it becomes possible to prevent the formation of vertical stripes in the printed material.

(3) In a conventional device, although it is possible to determine the matter causing vertical stripes on the surface of the reading glass, it is not possible to know the information such as whether that matter can be removed by means of cleaning or whether the reading glass needs to be replaced. In contrast, in the present embodiment, it becomes possible to determine whether or not the causing matter present on the surface of the reading glass is suitable for cleaning. That enables the user to take an appropriate action.

(4) From the overall length of a CCD line sensor or from the distance between lines of the CCD line sensor, it becomes possible to determine the size of the dirt present on the surface of the reading glass and to notify the location of the causing matter at the time of cleaning. Besides, the location of the causing matter at the image reading position can be detected, and reading can be performed while avoiding that position. For that reason, there is an expansion in the scope of processing in the case when the vertical stripe is formed. That is convenient from the perspective of the user.

(5) It is possible to think that the dirt present on the surface of the reading glass has two types: the dirt that is large enough so that formation of the vertical stripe cannot be prevented unless the reading glass is cleaned; and the dirt that is tiny enough to be avoidable by slightly adjusting the reading position so that formation of the vertical stripe can be prevented. By determining the type of the dirt, it becomes possible to simplify the operations to be performed when the vertical stripe is formed. As a result, formation of the vertical stripe can be reduced for sure.

(6) There are times when the dirt of such a size is detected which enables achieving reduction in the vertical stripe either by cleaning or by adjusting the reading position. In such a case, the user is prompted to instruct the action to be taken. As a result, it becomes possible to meet the needs of users who wish to reliably eliminate the cause of vertical stripes as well as to meet the needs of users who wish to maintain the productivity. As a result, there is further enhancement in the user friendliness.

Thus, according to an aspect of the present invention, in an image reading device including a sheet-through reading unit, if a vertical stripe is formed in a read image, the configuration is such that not only the information on the location of the causing matter that causes the vertical stripe can be provided but also the information on the type of the causing matter can be provided. That makes it easier for the user to take appropriate actions.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device that includes a sheet-through reading unit in which a reading unit is fixed and image reading is performed through a reading glass while carrying an original, the image reading device comprising:
   a reading glass moving unit configured to move the reading glass in a direction orthogonal to an original carrying direction;
   a vertical stripe formation determining unit configured to determine whether or not a read image obtained by the sheet-through reading unit includes a vertical stripe which represents linear images continuous in the original carrying direction;
   a vertical stripe position determining unit configured to, when a vertical stripe is formed, determine matching/mismatching of positions of the vertical stripe in read images of an original carrying member which are obtained before and after moving the reading glass;
   a causing matter location determining unit configured to, based on determination indicating mismatching performed by the vertical stripe position determining unit, determine that a causing matter of the vertical stripe is present on the reading glass and, based on determination indicating matching performed by the vertical stripe position determining unit, determine that a causing matter of the vertical stripe is present on a portion other than the reading glass; and
   a causing matter type determining unit configured to determine a type of the causing matter.

2. The image reading device according to claim 1, further comprising:
   a vertical stripe density determining unit configured to determine a density of the vertical stripe present in the read image, wherein
   based on a density determination result about the vertical stripe as obtained by the vertical stripe density determining unit, the causing matter type determining unit determines whether the causing matter is an entity or a scratch, and
   the image reading device further comprises a notifying unit configured to issue a notification based on a determination result obtained by the causing matter type determining unit.

3. The image reading device according to claim 1, further comprising:
   a movement amount detector configured to detect an amount of movement of the reading glass; and
   a shift amount calculator configured to calculate an amount of shift in the vertical stripe in read images of the original carrying member which are obtained before and after moving the reading glass in a main-scanning direction, wherein
   the causing matter type determining unit determines whether the causing matter has a sticking tendency or a floating tendency, and
   on a condition that the causing matter is determined to be present on the reading glass, the causing matter type determining unit determines whether the causing matter has a sticking tendency or a floating tendency based on matching or mismatching of the amount of movement of the reading glass and the amount of shift in the vertical stripe present in read images which are obtained before and after moving the reading glass in a the main-scanning direction.

4. The image reading device according to claim 1, further comprising:
   a size determining unit configured to, based on a size and a position of the vertical stripe formed in a read image of each line component of a plurality of line sensors which reads an image, determine a size and a position of the causing matter; and
   a vertical stripe avoidance action determining unit configured to determine whether or not to adjust the position of the reading unit in order to avoid formation of the vertical stripe, wherein
   when the size determining unit determines that the size and the position of the causing matter is within a predetermined range, on a condition that the causing matter of the vertical stripe is present on the reading glass, the vertical stripe avoidance action determining unit moves the reading unit to the outside of a range of existence of the causing matter.

5. The image reading device according to claim 4, wherein
   the size determining unit determines a size and a position in the main-scanning direction of dirt present on the reading glass by referring to a thickness and a position of the vertical stripe in the main-scanning direction of the reading image, and determines a length in a sub-scanning direction of the dirt present on the reading glass by referring to a length of the vertical stripe in the read image of each line component of the line sensors, and
   the image reading device further comprises a notifying unit that notifies the size and the position of the dirt based on information obtained by the size determining unit.

6. The image reading device according to claim 1, further comprising a receiving unit configured to receive an instruction from a user about whether or not to determine a location of the causing matter using the causing matter location determining unit.

7. The image reading device according to claim 1, wherein
   the vertical stripe position determining unit determines whether or not a read image of a carrying surface of the original carrying member obtained by the sheet-through reading unit matches with a read image of the carrying surface of the original carrying member obtained in between originals carried during sheet-through reading, and
   based on a determination result obtained by the vertical stripe position unit, the causing matter location determining unit determines whether or not a causing matter is newly formed on the reading glass.

8. The image reading device according to claim 7, wherein, when the size determining unit determines that the size and the position of the causing matter is within a predetermined range, the vertical stripe avoidance action determining unit does not move the reading unit to the outside of a range of existence of the causing matter, and the notifying unit issues a notification to prompt a user to perform cleaning.

9. A vertical stripe determination method implemented in an image reading device that includes a sheet-through reading unit in which a reading unit is fixed and image reading is performed through a reading glass while carrying an original, the vertical stripe determination method comprising:
   determining whether or not a read image obtained by the sheet-through reading unit includes a vertical stripe which represents linear images continuous in an original carrying direction;
   determining, when a vertical stripe is formed, matching/mismatching of positions of the vertical stripe in read images obtained before and after moving the reading glass in a direction orthogonal to the original carrying direction;

determining, based on determination indicating mismatching at the vertical-stripe-position-determining, that a causing matter of the vertical stripe is present on the reading glass and determining, based on determination indicating matching at the vertical-stripe-position-determining, that a causing matter of the vertical stripe is present on a portion other than the reading glass; and determining a type of the causing matter.

10. A non-transitory computer readable medium embodying programmed instructions which, when executed by a processor, are operable for performing a method for an image reading device that includes a sheet-through reading unit in which a reading unit is fixed and image reading is performed through a reading glass while carrying an original, the method comprising:

determining whether or not a read image obtained by the sheet-through reading unit includes a vertical stripe which represents linear images continuous in an original carrying direction;

determining, when a vertical stripe is formed, matching/mismatching of positions of the vertical stripe in read images obtained before and after moving the reading glass in a direction orthogonal to the original carrying direction;

determining, based on determination indicating mismatching at the vertical-stripe-position-determining, that a causing matter of the vertical stripe is present on the reading glass and determining, based on determination indicating matching at the vertical-stripe-position-determining, that a causing matter of the vertical stripe is present on a portion other than the reading glass; and determining a type of the causing matter.

11. The medium of claim 10, the method further comprising:

calculating an amount of shift in the vertical stripe after moving the reading glass in the original carrying direction.

* * * * *